(12) United States Patent
Hawkes et al.

(10) Patent No.: US 9,392,494 B2
(45) Date of Patent: Jul. 12, 2016

(54) SYSTEMS AND METHODS FOR REDUCED LATENCY DURING INITIAL LINK SETUP

(71) Applicant: QUALCOMM Incorporated, San Diego, CA (US)

(72) Inventors: Philip Michael Hawkes, Warrimoo (AU); George Cherian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 80 days.

(21) Appl. No.: 14/331,118

(22) Filed: Jul. 14, 2014

(65) Prior Publication Data

US 2015/0016416 A1 Jan. 15, 2015

Related U.S. Application Data

(60) Provisional application No. 61/846,536, filed on Jul. 15, 2013, provisional application No. 61/859,611, filed on Jul. 29, 2013.

(51) Int. Cl.
*H04W 4/00* (2009.01)
*H04W 36/00* (2009.01)
(Continued)

(52) U.S. Cl.
CPC ......... *H04W 36/0016* (2013.01); *H04L 61/203* (2013.01); *H04L 61/2015* (2013.01); *H04L 61/2084* (2013.01); *H04W 8/26* (2013.01); *H04W 36/0072* (2013.01); *H04W 36/0077* (2013.01); *H04W 36/0055* (2013.01); *H04W 60/00* (2013.01)

(58) Field of Classification Search
CPC combination set(s) only.
See application file for complete search history.

(56) References Cited

U.S. PATENT DOCUMENTS 8,050,678 B2 * 11/2011 Lin ..................... H04L 63/0823
370/331
2003/0067923 A1 4/2003 Ju et al.
(Continued)

FOREIGN PATENT DOCUMENTS

EP 1505799 A1 2/2005
WO 2008011542 A1 1/2008
(Continued)

OTHER PUBLICATIONS

Khan et al, Wireless Handoff Optimization: A Comparison of IEEE 802.11r and HOKEY, IFIP International Federation for Information Processing, 14 pages, 2010.*
(Continued)

*Primary Examiner* — Frank Duong
(74) *Attorney, Agent, or Firm* — Toler Law Group

(57) ABSTRACT

A method of operation of a mobile device to reduce link setup time includes initiating a link setup procedure with a first access point. The link setup procedure includes receiving dynamic host configuration protocol (DHCP) information via the first access point. The method further includes communicating with the first access point using the DHCP information and initiating communication with a second access point after communicating with the first access point. The method further includes receiving an indication from the second access point identifying whether the mobile device is able to communicate with the second access point using the DHCP information. A value of the indication identifies whether the mobile device is able to reduce link setup time with the second access point by avoiding DHCP reconfiguration with the second access point.

41 Claims, 18 Drawing Sheets

(51) Int. Cl.
*H04L 29/12* (2006.01)
*H04W 8/26* (2009.01)
*H04W 60/00* (2009.01)

(56) References Cited

U.S. PATENT DOCUMENTS

| | | |
|---|---|---|
| 2005/0138178 A1 | 6/2005 | Astarabadi |
| 2005/0163078 A1 | 7/2005 | Oba et al. |
| 2006/0018281 A1 | 1/2006 | Sadot et al. |
| 2006/0050673 A1 | 3/2006 | Park et al. |
| 2007/0002833 A1 | 1/2007 | Bajic |
| 2007/0160049 A1 | 7/2007 | Xie et al. |
| 2008/0019319 A1* | 1/2008 | Bahini .............. H04L 29/12018 370/331 |
| 2009/0006585 A1 | 1/2009 | Chen |
| 2013/0114463 A1* | 5/2013 | Li .................. H04W 48/18 370/254 |
| 2013/0176897 A1* | 7/2013 | Wang ................ H04W 12/06 370/254 |
| 2015/0016415 A1 | 1/2015 | Cherian et al. |

FOREIGN PATENT DOCUMENTS

| | | |
|---|---|---|
| WO | 2013004905 A1 | 1/2013 |
| WO | 2013040039 A1 | 3/2013 |
| WO | 2014130660 A1 | 8/2014 |

OTHER PUBLICATIONS

"IEEE 802.11" from Wikipedia, the Free Encyclopedia, viewed May 22, 2014, http://en.wikipedia.org/wiki/IEEE_802.11, 19 pp.

Droms, R., "Dynamic Host Configuration Protocol", Request for Comments: 2131, Bucknell University, Mar. 1997, 39 pp.

Aboba, B., et al., "Extensible Authentication Protocol (EAP)", Request for Comments: 3748, Jun. 2004, 67 pp.

Narayanan, V., et al. "EAP Extensions for EAP Re-Authentication Protocol (ERP)", Request for Comments: 5296, Qualcomm, Inc., Aug. 2008, 43 pp.

International Search Report and Written Opinion—PCT/US2014/046709—ISA/EPO—Nov. 13, 2014.

International Search Report and Written Opinion—PCT/US2014/046717—ISA/EPO—Nov. 13, 2014.

* cited by examiner

SYSTEMS AND METHODS FOR REDUCED LATENCY DURING INITIAL LINK SETUP

CROSS-REFERENCE TO RELATED APPLICATIONS

The present application claims priority from U.S. Provisional Patent Application No. 61/846,536, filed Jul. 15, 2013 and entitled "SYSTEMS AND METHODS FOR REDUCED LATENCY DURING INITIAL LINK SETUP", and also claims priority from U.S. Provisional Patent Application No. 61/859,611, filed on Jul. 29, 2013 and entitled "SYSTEM AND METHOD TO ASSIGN AN INTERNET PROTOCOL ADDRESS TO A MOBILE DEVICE DURING A HANDOFF". The disclosures of the aforementioned applications are incorporated by reference herein in their entirety.

BACKGROUND

1. Field

The present application relates generally to wireless communication systems and more specifically to systems, methods, and devices for fast initial network link setup within wireless communication systems.

2. Background

Advances in technology have resulted in smaller and more powerful electronic devices. For example, there currently exist a variety of mobile devices, such as wireless telephones, personal digital assistants (PDAs), and paging devices. The mobile devices may be small, lightweight, and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio file player. Also, wireless telephones can process executable instructions including software applications, such as a web browser application, that can be used to access the Internet. Wireless telephones and other mobile devices may communicate data with other devices (e.g., an access point) via a wireless link (e.g., using a wireless channel, such as a particular frequency, or another type of wireless channel, etc.).

A mobile device and an access point may exchange certain initial communications related to network information prior to exchanging user data. For example, prior to exchanging user data, the mobile device and the access point may perform a "link setup" procedure by exchanging information related to types of communication techniques supported, network addresses, authentication information, and/or association information, as illustrative examples. In some cases, a large number of mobile devices may attempt to establish wireless connectivity with a particular access point. For example, when several mobile devices move within range of an access point, the access point may experience an increased rate of link setup requests, creating latencies in the link setup process. Accordingly, there is a need for improved initial link setup procedures in a wireless communication network.

SUMMARY

Wireless connectivity setup time (or "link setup" time) between a mobile device and an access point (AP) is reduced by enabling the mobile device to avoid dynamic host configuration protocol (DHCP) processes in certain cases. To illustrate, the mobile device may initiate a DHCP process during initial link setup with a first AP to enable Internet Protocol (IP) communications. For example, the mobile device may communicate with a DHCP server (via the first AP) to obtain a DHCP "lease" that provides the mobile device with DHCP information. The DHCP information may include an IP address that is valid for a particular time duration. After initiating the DHCP process and prior to expiration of the DHCP lease, a user of the mobile device may move out of range of the first AP and within range of a second AP, triggering a "handoff" of the mobile device from the first AP to the second AP. Based on the handoff, the DHCP server may determine what IP address (e.g., a "new" IP address) to assign to the mobile device. The process of determining the "new" IP address may cause delay during the handoff procedure. For example, the DHCP server may take more than one second to determine the "new" IP address. The delay to the completion time of the handoff procedure may cause the handoff procedure to fail to complete before the mobile device moves out of the coverage area of the first AP. Thus, in this case, an ongoing communication session at the mobile device may be interrupted or terminated during the handoff procedure.

The present application describes systems and methods to shorten handoff time and to enable IP address assignment without communicating with a DHCP server. According to a first method, a mobile device may be reassigned a previous IP address by an access point when the mobile device associates with the access point during handoff. To illustrate, the mobile device may be assigned a first IP address from a DHCP server when the mobile device is associated with a first AP. The first IP address may also be provided to a server, such as an authentication server. When the mobile device initiates a handoff procedure with a second AP, the mobile device may request the first IP address from the second AP. The second AP may compare the requested IP address to an IP address provided by the authentication server. When the requested IP address matches the IP address provided by the authentication server, the second AP may reassign the first IP address to the mobile device. Thus, the mobile device may be reassigned the same IP address during handoff without involvement of a DHCP server during the handoff.

In accordance with a second method, instead of automatically re-initiating the DHCP process with the second AP as in certain conventional systems, the mobile device may maintain the current DHCP lease. In a particular embodiment, the mobile device receives an indication from the second AP during initial link setup with the second AP. The indication may specify whether the first AP and the second AP are included in a common network (e.g., a network of APs managed by a common DHCP server). If the first AP and the second AP are included in a common network, the mobile device may continue to use the DHCP information (e.g., instead of re-performing the DHCP process to obtain a new IP address), thus reducing a time duration for establishing connectivity with the second AP.

In a particular embodiment, a method of operation of a mobile device to reduce link setup time includes initiating a link setup procedure with a first access point. The link setup procedure includes receiving dynamic host configuration protocol (DHCP) information via the first access point. The method further includes communicating with the first access point using the DHCP information and initiating communication with a second access point after communicating with the first access point. The method further includes receiving an indication from the second access point identifying whether the mobile device is able to communicate with the second access point using the DHCP information. A value of the indication identifies whether the mobile device is able to reduce link setup time with the second access point by avoiding DHCP reconfiguration with the second access point.

In another particular embodiment, an apparatus includes a memory and a radio frequency (RF) interface. The memory is configured to store DHCP information. The RF interface is configured to initiate a link setup procedure with a first access point. The link setup procedure includes receiving the DHCP information via the first access point. The RF interface is further configured to communicate with the first access point using the DHCP information, to initiate communication with a second access point, and to receive an indication from the second access point identifying whether to communicate with the second access point using the DHCP information. A value of the indication identifies whether link setup time with the second access point may be reduced by avoiding DHCP reconfiguration with the second access point.

In another particular embodiment, a computer-readable medium stores instructions executable by a processor of a mobile device to cause the mobile device to perform operations that reduce link setup time. The operations include initiating a link setup procedure with a first access point. The link setup procedure includes receiving dynamic host configuration protocol (DHCP) information via the first access point. The operations further include communicating with the first access point using the DHCP information and initiating communication with a second access point after communicating with the first access point. The operations further include receiving an indication from the second access point identifying whether the mobile device is able to communicate with the second access point using the DHCP information. A value of the indication identifies whether the mobile device is able to reduce link setup time with the second access point by avoiding DHCP reconfiguration with the second access point.

In another particular embodiment, an apparatus includes means for initiating a link setup procedure with a first access point. The link setup procedure includes receiving dynamic host configuration protocol (DHCP) information via the first access point. The apparatus further includes means for communicating with the first access point using the DHCP information and means for initiating communication with a second access point after communicating with the first access point. The apparatus further includes means for receiving an indication from the second access point identifying whether the mobile device may communicate with the second access point using the DHCP information. A value of the indication identifies whether link setup time with the second access point may be reduced by avoiding DHCP reconfiguration with the second access point.

A particular advantage provided by at least one of the disclosed embodiments is faster initial link setup. For example, a mobile device may avoid automatic reconfiguration of DHCP in response to link setup with an access point. Instead, the mobile device may utilize existing DHCP credentials to communicate with the access point in some circumstances, reducing a latency associated with establishing wireless connectivity with the access point. Other aspects, advantages, and features of the present disclosure will become apparent after review of the entire application, including the following sections: Brief Description of the Drawings, Detailed Description, and the Claims.

DETAILED DESCRIPTION

Figure 1:
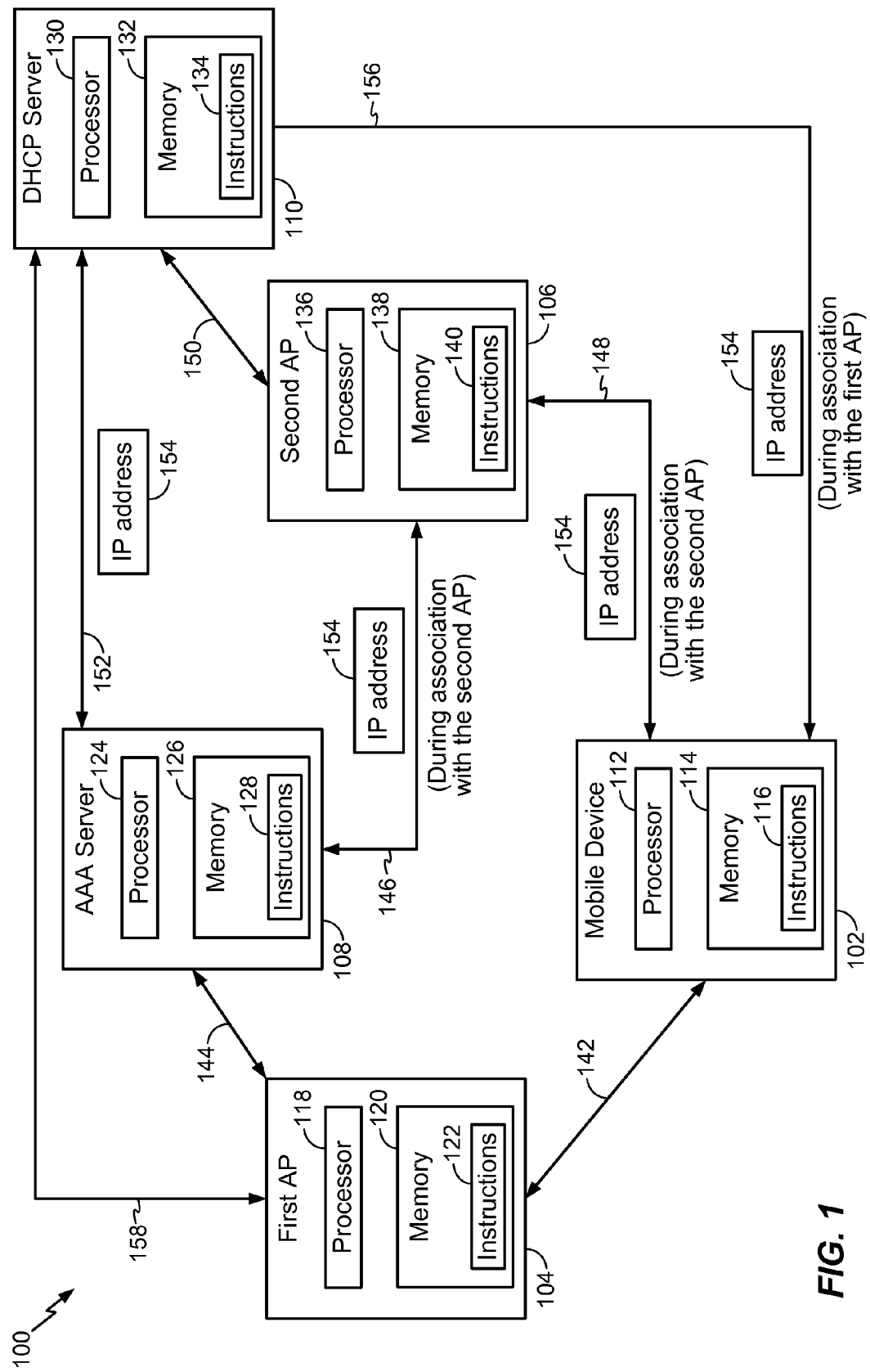
FIG. 1 is a diagram to illustrate a particular embodiment of a system operable to assign an IP address to a mobile device during a handoff procedure using an AP.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Particular embodiments of the present disclosure are described below with reference to the drawings. In the description and the drawings, common features are designated by common reference numbers for clarity of the embodiments as depicted and described.

The disclosure presents illustrative techniques to reduce link setup time in a communication system, such as by avoiding certain dynamic host configuration protocol (DHCP) reconfiguration operations. For example, FIGS. 1-11 describe that a particular internet protocol (IP) address can be assigned to a mobile device during communications with multiple access points, which may reduce link setup time. As another example, FIGS. 12-18 describe that a device, such as an access point, may transmit an indication to a mobile device indicating whether DHCP reconfiguration can be avoided to reduce link setup time. Thus, FIGS. 1-18 describe certain illustrative implementations that may facilitate reduced link setup time in a communication system.

FIG. 1 illustrates a particular embodiment of a system 100 that is operable to assign an IP address to a mobile device during a handoff procedure using an access point (AP). The system 100 may include a mobile device 102 (e.g., a wireless telephone, a laptop computer, a tablet computer, etc.), a first AP 104, a second AP 106, an authentication, authorization, and accounting (AAA) server 108, and a dynamic host configuration protocol (DHCP) server 110.

Each device, AP, and server of the system 100 may include a processor and a memory. The memory may include processor executable instructions. For example, the mobile device 102 may include a processor 112 and a memory 114. The memory 114 may include instructions 116 that are executable by the processor 112 to control operations of the mobile device 102. As another example, the first AP 104 may include a processor 118 and a memory 120. The memory 120 may include instructions 122 that are executable by the processor 118 to control operations of the first AP 104. As another example, the second AP 106 may include a processor 136 and a memory 138. The memory 138 may include instructions 140 that are executable by the processor 136 to control operations of the second AP 106. As another example, the AAA server 108 may include a processor 124 and a memory 126. The memory 126 may include instructions 128 that are executable by the processor 124 to control operations of the AAA server 108. As another example, the DHCP server 110 may include a processor 130 and a memory 132. The memory 132 may include instructions 134 that are executable by the processor 130 to control operations of the DHCP server 110.

In a particular embodiment, the first AP 104 and the second AP 106 are wireless APs. For example, the mobile device 102 may communicate with the first AP 104 or the second AP 106 via a wireless connection that is compliant with an Institute of Electrical and Electronics Engineers (IEEE) standard (e.g., an IEEE 802.11a standard, an IEEE 802.11b standard, an IEEE 802.11g standard, an IEEE 802.11ai standard, etc.). In another particular embodiment, the first AP 104 is a cellular (e.g., third generation (3G), fourth generation (4G), long term evolution (LTE), etc.) base station and the second AP 106 is a wireless AP. For example, the mobile device 102 may communicate with the first AP 104 using a cellular connection, and the mobile device 102 may communicate with the second AP 106 using a connection that is compliant with an IEEE standard. The first AP 104 and the second AP 106 may be owned by a common network operator. Thus, fast authentication (e.g., authentication using an extensible-authentication-protocol (EAP)-reauthentication-protocol (RP)) may be performed with the first AP 104 or the second AP 106.

During operation, the mobile device 102 may associate with the first AP 104 during a first association period. As used herein, the first association period includes a period during which the mobile device 102 authenticates with the first AP 104, a period during which the mobile device 102 associates with the first AP 104, a period during which the mobile device 102 uses an IP address to communicate with another device via the first AP 104, or a combination thereof. For example, the mobile device 102 may have notice of presence of the first AP 104 via a beacon message or a probe response message received from the first AP 104. The mobile device 102 perform authentication with the first AP 104 via a connection 142. For example, the mobile device 102 may transmit credentials of the mobile device 102 to the first AP 104 via the connection 142. The first AP 104 may forward the credentials to the AAA server 108 via a connection 144 for verification. When the mobile device 102 is authenticated, the first AP 104 may request the DHCP server 110 to assign an IP address (e.g., an IPv4 address or an IPv6 address) to the mobile device 102 via a connection 158. The DHCP server 110 may assign an IP address 154 to the mobile device 102 via a connection 156. Alternatively, the DHCP server 110 may forward the IP address 154 to the first AP 104, and the first AP 104 may forward the IP address 154 to the mobile device 102. The mobile device 102 may use the IP address 154 to communicate with another mobile device (not shown), one or more devices within the range of the first AP, one or more devices outside the range of the first AP (e.g., via the Internet), or any combination thereof.

When the mobile device 102 determines that the mobile device 102 is about to leave a coverage area of the first AP 104 (e.g., by measuring signal strength of the connection 142), the mobile device 102 may initiate a handoff procedure with the second AP 106 to associate with the second AP 106 during a second association period. As used herein, the second association period includes a period during which the mobile device 102 authenticates with the second AP 106, a period during which the mobile device 102 associates with the second AP 106, a period during which the mobile device 102 uses an IP address to communicate with another device via the second AP 106, or a combination thereof. The mobile device 102 may know about a presence of the second AP 106 via a beacon message or a probe response message received from the second AP 106. The mobile device 102 may also know about the presence of the second AP 106 via a handoff candidate list or table supplied from a network operator or a different source. The mobile device 102 may perform authentication with the second AP 106 via a connection 148. In a particular embodiment, the mobile device 102 performs authentication with the second AP 106 using EAP-RP. After authenticating with the second AP 106, the mobile device 102 may transmit an association request message to the second AP 106. The association request message may include a request for a particular IP address. When a time-to-live (TTL) period of the IP address 154 is valid (e.g., the TTL period has not expired) during the second association period, the mobile device 102 may request the same IP address 154. When the TTL period of the IP address 154 has expired during the second association period, the mobile device 102 may request a different IP address. The mobile device 102 may include an internal counter or clock to keep track of the TTL period. The TTL period may be set by the DHCP server 110.

In response to receiving the association request message, the second AP 106 may compare the particular IP address in the association request to an IP address that is assigned to the mobile device 102 during a prior association period (e.g., the IP address 154). The second AP 106 may obtain the IP address 154 from the AAA server 108 via a connection 146.

The AAA server 108 may obtain the IP address 154 from the DHCP server 110 via a connection 152. In a particular embodiment, the AAA server 108 obtains the IP address 154 from the DHCP server 110 during the first association period. In another particular embodiment, the AAA server 108 obtains the IP address 154 from the DHCP server 110 during the second association period. In another particular embodiment, the AAA server 108 obtains the IP address 154 from another device (e.g., another AP) that has knowledge of the assignment of the IP address 154 to the mobile device 102 during the first association period. In another particular embodiment, the DHCP server 110 forwards the IP address 154 to the AAA server 108 automatically (during the first or the second association period) upon assigning the IP address 154 to the mobile device 102. In another particular embodiment, the AAA server 108 transmits a request to the DHCP server 110 to request forwarding of the IP address 154. In response to receiving the request, the DHCP server 110 forwards the IP address 154 to the AAA server 108. Examples of such message flows are further described with reference to FIGS. 2-4.

The AAA server 108 may store the IP address 154 in the memory 126 until the TTL period of the IP address 154 expires. In a particular embodiment, the DHCP server 110 keeps track of the TTL period of the IP address 154, and upon expiration of the TTL period, the DHCP server 110 transmits a message to the AAA server 108 to indicate that the TTL period has expired. In response to receiving the message from the DHCP server 110, the AAA server 108 may delete the IP address 154 from the memory 126.

To determine an appropriate IP address to forward to the second AP 106 for comparison during the second association, the AAA server 108 may associate the IP address 154 with identification information of the mobile device 102. For example, the AAA server 108 may associate the IP address 154 with a medium access control (MAC) address of the mobile device 102. As another example, the AAA server 108 may associate the IP address 154 with a network access identifier (NAI) of the mobile device 102. The AAA server 108 may obtain the identification information from the DHCP server 110. For example, the DHCP server 110 may transmit the identification information along with the IP address 154 to the AAA server 108. Alternatively, the AAA server 108 may obtain the identification information from the first AP 104 or the second AP 106.

The second AP 106 may also associate the IP address 154 with the identification information of the mobile device 102 so that the second AP 106 may compare the particular IP address requested during the second association period to the IP address 154. For example, the AAA server 108 may include both the IP address 154 and the identification information of the mobile device 102 in the AAA-EAP-answer message. Based on the AAA-EAP-answer message, the second AP 106 may also associate the IP address 154 with the identification information of the mobile device 102. When the second AP 106 receives the association request message from the mobile device 102 during the second association period, the second AP 106 may determine which IP addresses obtained from the AAA server 108 is to be compared to the particular IP address in the association request message.

When the second AP 106 determines that the particular IP address matches the IP address 154, the second AP 106 may assign the IP address 154 to the mobile device 102 to complete the handoff procedure. Thus, the second AP 106 may assign an IP address to the mobile device during the second association period without communicating with the DHCP server 110. The mobile device 102 may use the IP address 154 to communicate with other mobile devices.

When the second AP 106 determines that the particular IP address does not match the IP address 154, the second AP 106 may request the DHCP server 110 to assign an IP address to the mobile device 102 via a connection 150. The DHCP server 110 may assign the particular IP address (i.e., as requested by the mobile device 102, but different from the IP address 154) to the mobile device 102 when the particular IP address is available (e.g., not assigned to any other device associated with the second AP 106). The DHCP server 110 may assign a different IP address (i.e., different from the IP address requested by the mobile device 102 and different from the IP address 154) to the mobile device 102 when the particular IP address is not available. In a particular embodiment, the DHCP server 110 forwards the assigned IP address to the second AP 106 and the second AP 106 forwards the assigned IP address to the mobile device 102 in the association response message to complete the handoff procedure. The mobile device 102 may use the assigned IP address to communicate with other devices.

The system 100 may thus enable an AP (e.g., the second AP 106) to assign a mobile device an IP address (e.g., the IP address 154) that was previously assigned to the mobile device during a handoff procedure. Thus, a completion time of the handoff procedure may be reduced as compared to using a DHCP server (e.g., the DHCP server 110) to assign the IP address during or after the handoff procedure.

Figure 2:
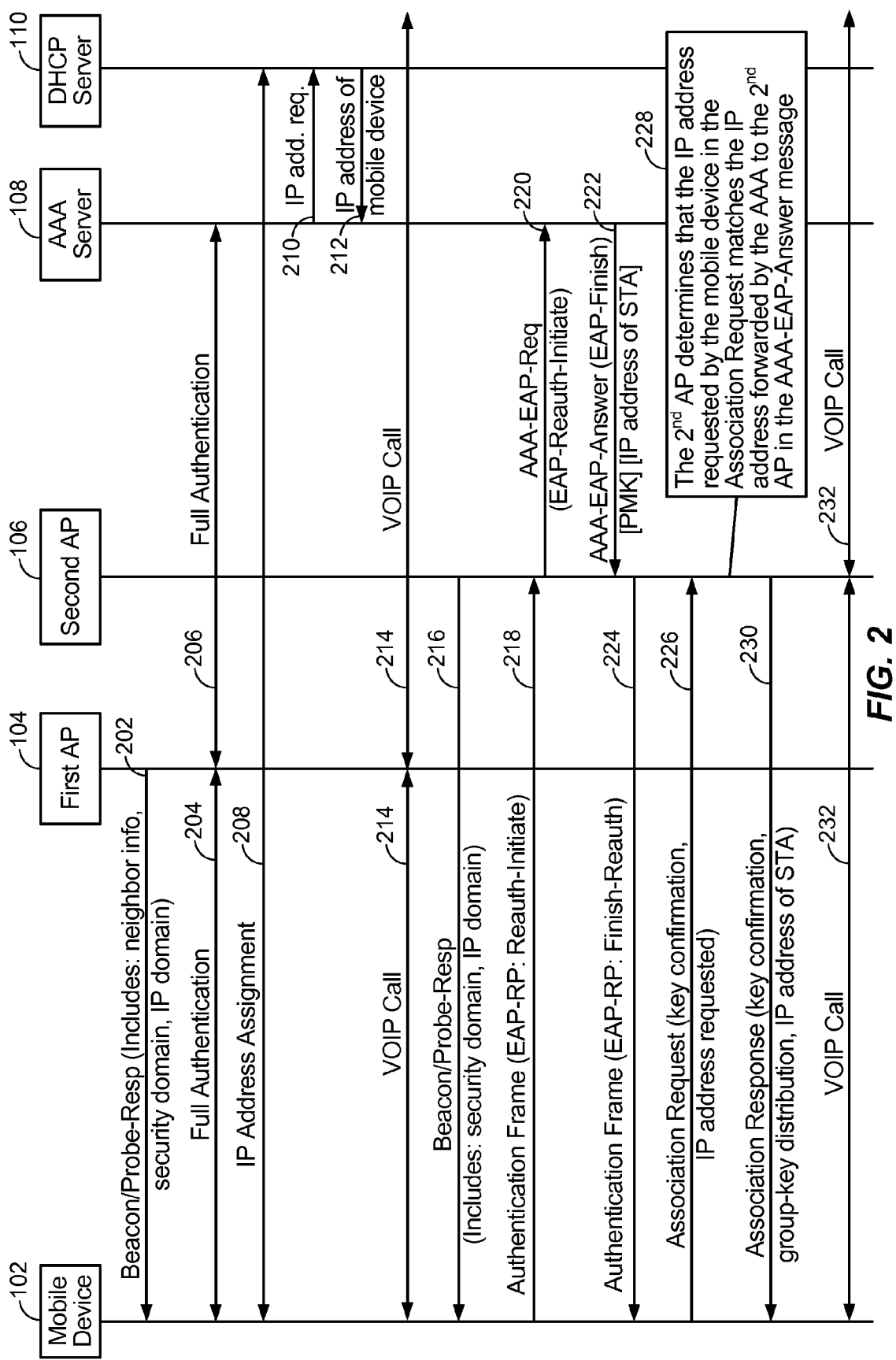
FIG. 2 is a diagram to illustrate a particular embodiment of messaging flows of the system of FIG. 1.

FIG. 2 is a diagram to illustrate a particular embodiment of messaging flows of the system 100 of FIG. 1. At 202, the mobile device 102 may receive a first beacon message or a first probe response message from the first AP 104. The first beacon message may include neighbor information of the first AP 104, security domain information of the first AP 104, and IP domain information of the first AP 104. At 204, based on the first beacon message, the mobile device 102 may associate with the first AP 104 during a first association period. For example, the mobile device 102 may perform a "full" authentication with the first AP 104. For example, the mobile device 102 may transmit credentials of the mobile device 102 to the first AP 104. At 206, the first AP 104 may forward the credentials to the AAA server 108 for verification.

At 208, in response to receiving the IP address assignment request, the DHCP server 110 may assign a first IP address (e.g., the IP address 154 of FIG. 1) to the mobile device 102. At 210, the AAA server 108 may request the DHCP server 110 to transmit the IP address (e.g., the first IP address) assigned to the mobile device 102 via a request message. At 212, after assigning the first IP address to the mobile device 102, the DHCP server 110 may forward the first IP address to the AAA server 108 in response to receiving the request message from the AAA server 108. The AAA server 108 may store the first IP address until a TTL period of the first IP address expires. At 214, the mobile device 102 may use the first IP address to communicate (e.g., initiate or receive a voice over IP (VOIP) call) with another mobile device.

At 216, the mobile device 102 may receive a second beacon message (or a second probe response message) from the second AP 106. The mobile device 102 may receive the second beacon message when the mobile device 102 is in a coverage area of the second AP 106. The second beacon message may include neighbor information of the second AP 106, security domain information of the second AP 106, and IP domain information of the second AP 106. At 218, the mobile device 102 may initiate a handoff procedure to associate with the second AP 106 during a second association period (e.g., due to moving away from a coverage area of the first AP 104) while the communication (e.g., the VOIP call) with the other mobile device is still active. For example, the mobile device 102 may perform authentication with the second AP 106 using the EAP-RP. The mobile device 102 may transmit a first authentication frame (e.g., a reauthentication-initiation message) to the second AP 106.

At 220, the second AP 106 may transmit an AAA-EAP-request message to the AAA server 108. The AAA-EAP-request message may include the first authentication frame in a payload of the AAA-EAP-request message. At 222, in response to receiving the AAA-EAP-request message, the AAA server 108 may transmit an AAA-EAP-answer message (e.g., an EAP finish message) to the second AP 106. The AAA-EAP-answer message may include a pair-wise master key (PMK) and the first IP address.

At 224, in response to receiving the AAA-EAP-answer message, the second AP 106 may transmit a second authentication frame (e.g., a finish-reauthentication message) to the mobile device 102. At 226, in response to receiving the AAA-EAP-answer message, the mobile device 102 may transmit an association request message to the second AP 106. The association request may include key confirmation and a particular IP address requested by the mobile device 102. At 228, in response to receiving the association request message, the second AP 106 may compare the particular IP address to the first IP address to determine whether the particular IP address matches the first IP address.

At 230, when the second AP 106 determines that the particular IP address matches the first IP address, the second AP 106 may assign the first IP address to the mobile device 102 to be used during the second association period. For example, the second AP 106 may transmit an association response message to the mobile device 102. The association response message may include key confirmation, group key distribution information, and the first IP address. When the second AP 106 determines that the particular IP address does not match the first IP address, the second AP 106 may initiate procedures with DHCP server 110 to request the DHCP server 110 to assign a "new" IP address to the mobile device 102, which may differ from the IP address 154 that was previously assigned to the mobile device 102. Assigning a "new" IP address using the DHCP server 110 during the second association period is described in more detail in FIG. 4. When the mobile device 102 receives the assignment of the first IP address, the handoff procedure is completed. At 232, the mobile device 102 may use the first IP address to continue communicating with the other mobile device. Thus, a completion time of the handoff procedure may be reduced while maintaining communication between the mobile device 102 and the other mobile device (e.g., without dropping the VOIP call).

Figure 3:
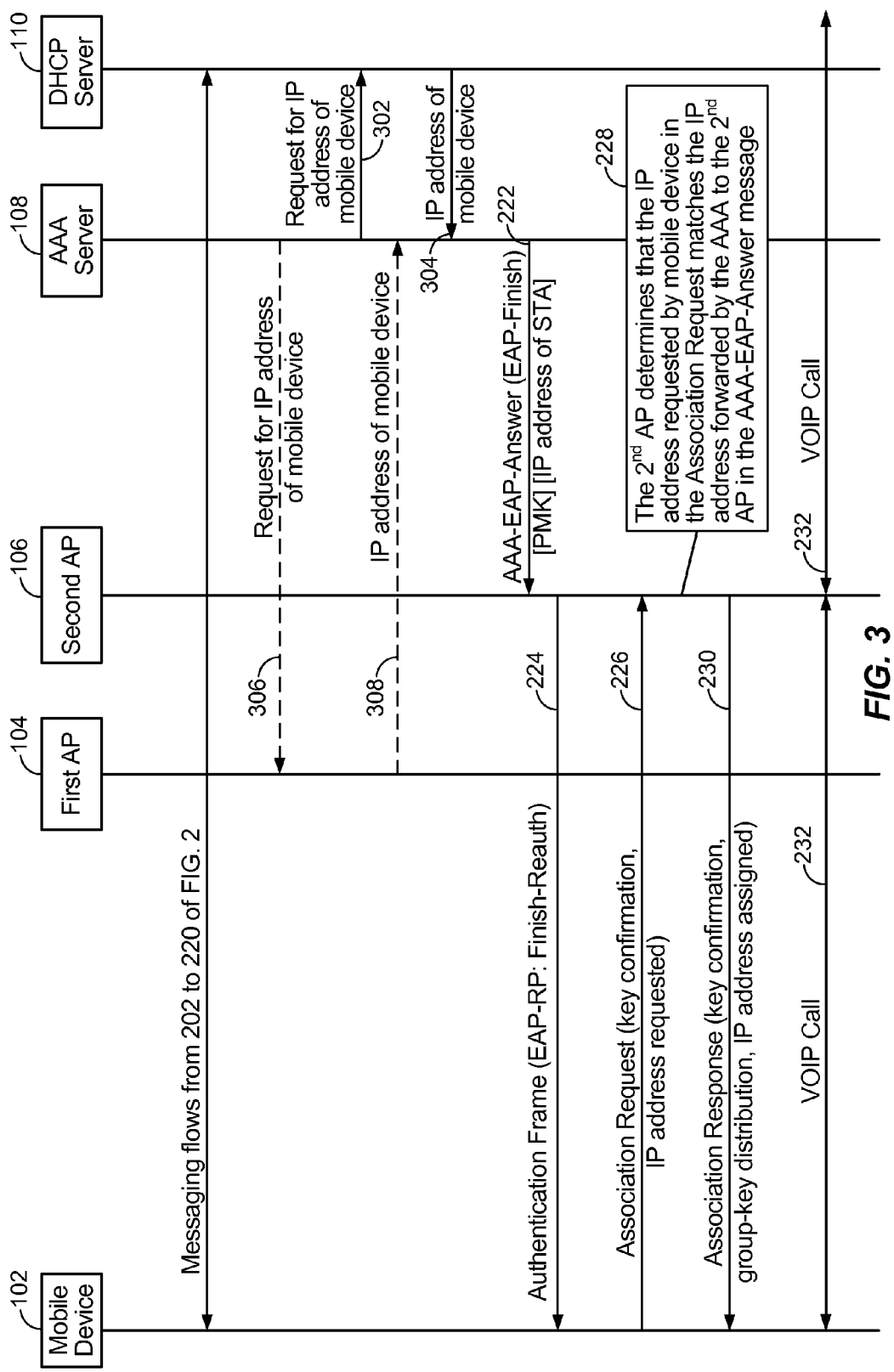
FIG. 3 is a diagram to illustrate another particular embodiment of messaging flows of the system of FIG. 1 during a handoff procedure.

FIG. 3 illustrates another particular embodiment of messaging flows of the system 100 of FIG. 1 during a handoff procedure. In particular, FIG. 3 illustrates two embodiments of messaging that may be communicated after the second AP 106 transmits the AAA-EAP-request message to the AAA server 108, at 220 of FIG. 2, and prior to the AAA server 108 transmitting the AAA-EAP-answer message, at 222 of FIG. 2. The first embodiment illustrated in FIG. 3 includes messaging flows 302-304, and the second embodiment illustrated in FIG. 3 includes messaging flows 306-308. In the first embodiment, the DHCP server 110 forwards the previously assigned IP address of mobile device 102 to the AAA server 108. In the second embodiment, the first AP 104 forwards the IP address to the AAA server 108. Thus, the messaging 302-304 or 306-308 may be communicated instead of, or in addition to, the messaging 210-212 of FIG. 2.

In accordance with the first embodiment illustrated in FIG. 3, at 302, during the second association period, the AAA server 108 may request the first IP address (e.g., an IP address assigned to the mobile device 102 during a prior association period) from the DHCP server 110 via a request message. The AAA server 108 may request an IP address assigned to the mobile device 102 during a prior association period (e.g., the first IP address) in response to receiving the AAA-EAP-request message (e.g., at 220 of FIG. 2) indicating that the mobile device 102 is in the performing a handoff procedure and the mobile device 102 has been assigned an IP address during the prior association period (e.g., the first association period). The AAA server 108 may include identification information of the mobile device (e.g., the MAC address, the NAI information, etc.) in the request message. Based on the identification information, the DHCP server 110 may retrieve the first IP address that is assigned to the mobile device 102 during a prior association period. At 304, the DHCP server 110 may transmit the IP address to the AAA server 108 via a response message in response to receiving the request message. After transmission of the IP address to the AAA server at 304, the messaging 222-232 described with reference to FIG. 2 may be communicated, as shown.

In accordance with the second embodiment illustrated in FIG. 3, the AAA server 108 may request and receive the IP address from the first AP 104. For example, the AAA server 108 may request the IP address assigned to the mobile device 102 during the prior association period from the first AP 104 via a request message during the second association period, at 306. At 308, in response to receiving the request message, the first AP 104 transmits the first IP address to the AAA server 108. After transmission of the IP address to the AAA server at 308, the messaging flows 222-232 described with reference to FIG. 2 may occur, as shown.

Figure 4:
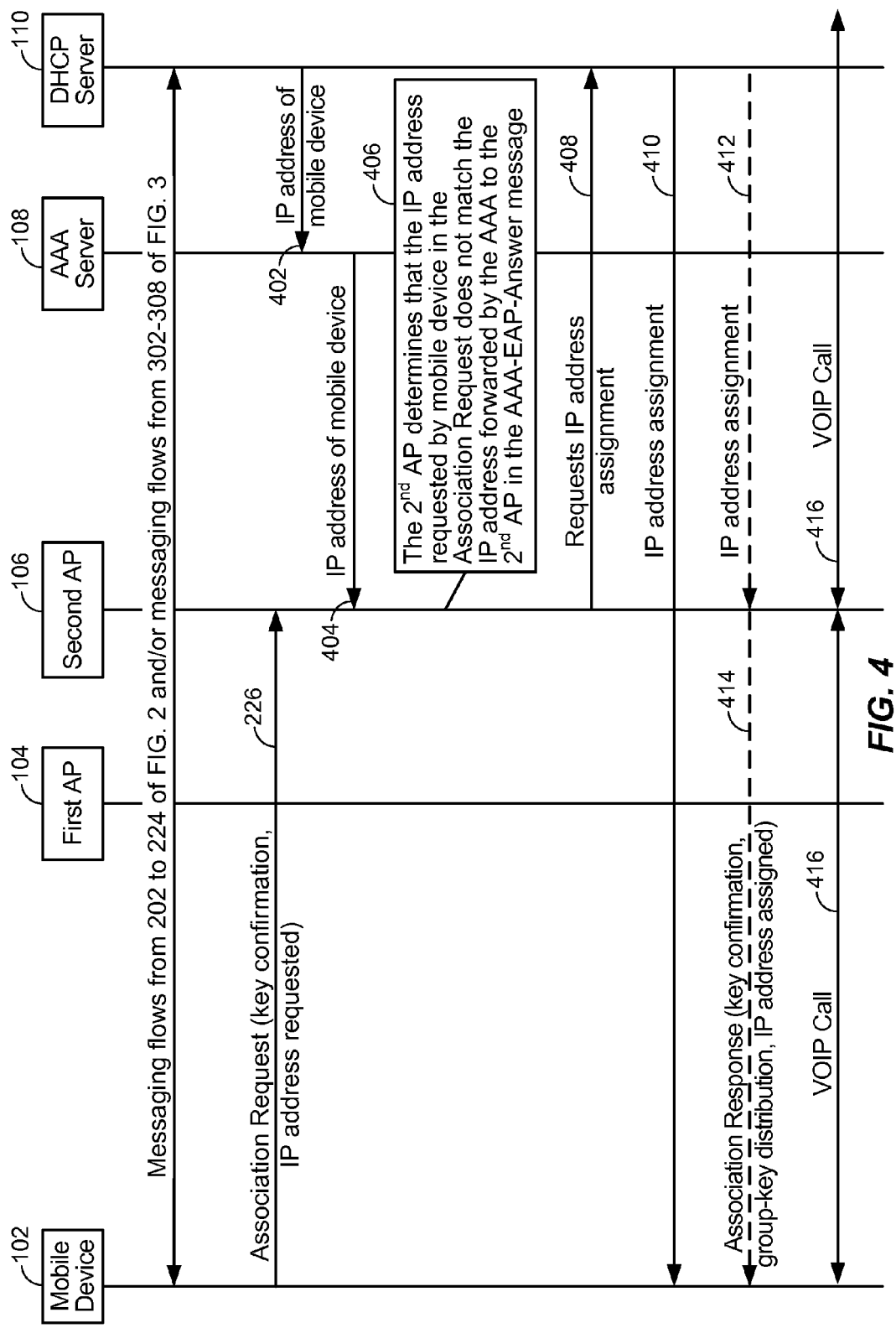
FIG. 4 is a diagram to illustrate another particular embodiment of messaging flows of the system of FIG. 1 during the handoff procedure.

It is noted that FIGS. 2-3 illustrate messaging flows in which the IP address requested by the mobile device 102 from the second AP 106 matches the IP address that was assigned to the mobile device 102 while the mobile device 102 was associated with the first AP 104. Thus, in FIGS. 2-3, the second AP 106 reassigns the same IP address to the mobile device 102, at 230, after detecting the match, at 228. However, in some situations, the mobile device 102 may request the second AP 106 for an IP address that does not match the previously assigned IP address. FIG. 4 illustrates an embodiment of messaging flows of the system 100 of FIG. 1 during the handoff procedure in such situations. In particular, FIG. 4 illustrates messaging flows of the system 100 when the second AP 106 determines that the IP address requested by the mobile device 102 does not match the IP address 154 assigned to the mobile device 102 during the first association period. Thus, messaging illustrated in FIG. 4 may be communicated after the messaging 202-226 of FIG. 2 and/or the messaging 302-308 of FIG. 3, and may replace the messaging 228-232 of FIG. 2. At 402, the AAA server 108 may obtain the IP address (e.g., the first IP address) assigned to the mobile device 102 during the prior association period (e.g., the first association period) from the DHCP server 110. For example, the AAA server 108 may obtain the first IP address during the first association period, during the second association period, prior to the second AP 106 receiving the association request message from the mobile device 102, or after the second AP 106 receiving the association request message from the mobile device.

At 404, the AAA server 108 may forward the first IP address to the second AP 106. At 406, the second AP 106 may determine that the IP address requested by the mobile device 102 does not match the first IP address. At 408, in response to a determination that the IP address requested by the mobile device 102 does not match the first IP address, the second AP 106 may transmit a request to the DHCP server 110 to request the DHCP server 110 to assign a "new" IP address to the mobile device 102 to be used during the second association period. At 410, in response to receiving the request, the DHCP server 110 may assign an IP address. The DHCP server 110 may assign the IP address requested by the mobile device 102 or another IP address when the requested IP address is not available. The DHCP server 110 may send the assigned IP address to the mobile device 102. At 416, the mobile device 102 may use the assigned IP address to communicate with another device.

In an alternative embodiment, at 412, the DHCP server 110 may send the assigned IP address to the second AP 106. At 414, the second AP 106 may forward the assigned IP address to the mobile device 102.

It should be noted that although various embodiments may be described herein with reference to handoff during a VOIP call, the present disclosure is not so limited. The systems and methods of the present disclosure may also enable assignment or reassignment of an IP address to a device during a non-VOIP connection or a session that may be sensitive to an interruption. As illustrative non-limiting examples, during a handoff, a mobile device may receive an assignment or reassignment of an IP address while the mobile device is conducting a video call and/or a data connection.

Figure 5:
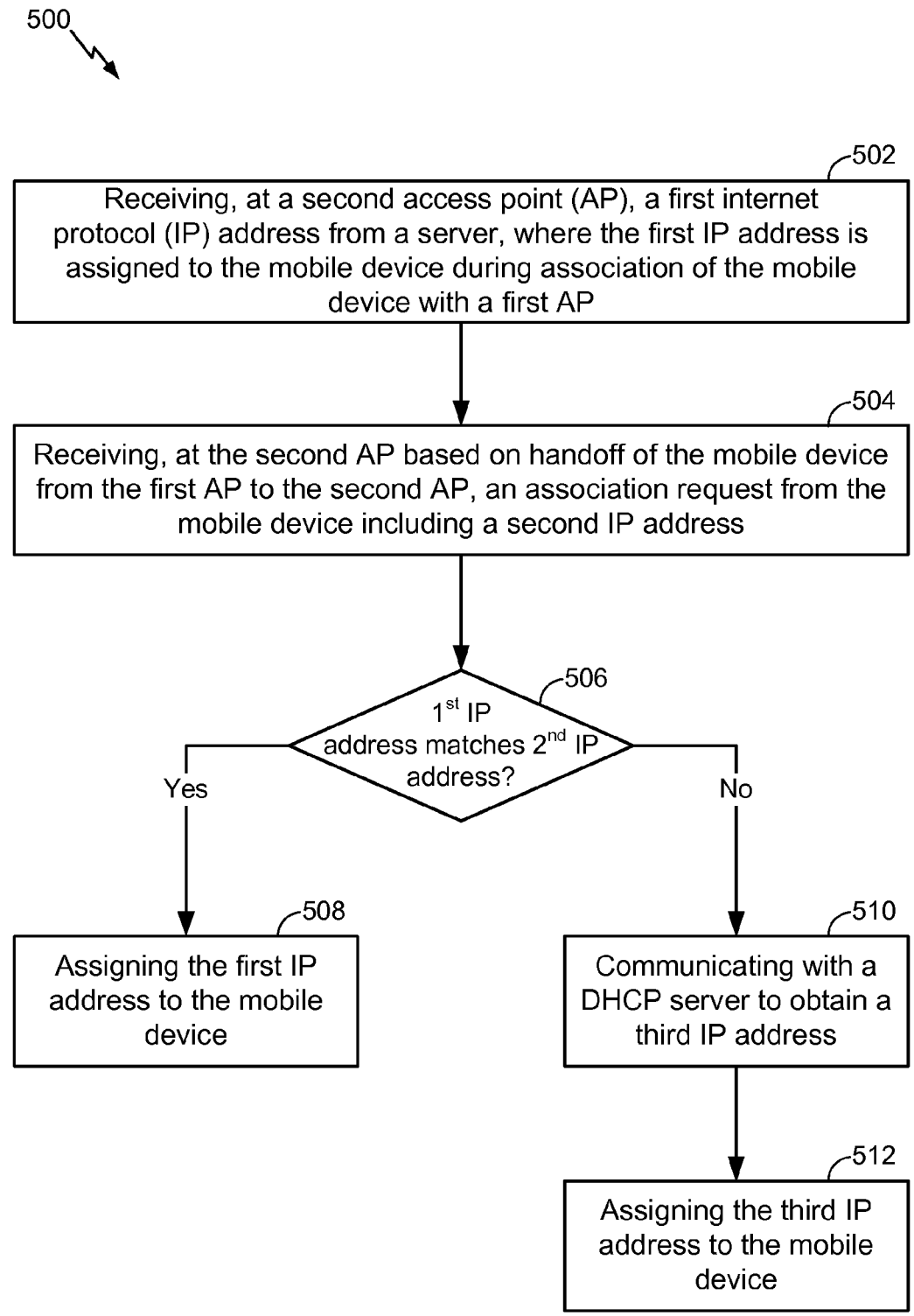
FIG. 5 is a flowchart to illustrate a particular embodiment of a method of operation at an access point of FIG. 1.

FIG. 5 is flowchart to illustrate a particular embodiment of a method 500 of operation at an access point (e.g., the second AP 106 of FIG. 1). The method 500 includes receiving, at a second access point (AP), a first internet protocol (IP) address from a server, at 502. The first IP address is assigned to the mobile device during association of the mobile device with a first AP. For example, referring to FIG. 1, the second AP 106 may obtain the IP address 154 from the AAA server 108. The second AP 106 may obtain the IP address 154 prior to receiving an association request from the mobile device 102, where the IP address 154 was assigned to the mobile device 102 while the mobile device 102 was associated with the first AP 104. The method 500 also includes receiving, at the second AP based on a handoff of the mobile device from the first AP to the second AP, an association request from the mobile device, at 504. The association request includes a second IP address. For example, referring to FIG. 1, in response to receiving the second authentication frame, the mobile device 102 may request a particular IP address from the second AP 106 via an association request message. The particular IP address may be the first IP address when a time to live (TTL) period of the first IP address is valid.

The method 500 may further include determining, at 506, whether the first IP address matches the second IP address. For example, referring to FIG. 1, the second AP 106 may determine whether the particular IP address matches the IP address 154. When the first IP address matches the second IP address, the method 500 may include assigning the first IP address to the mobile device, at 508. For example, referring to FIG. 1, the second AP 106 may assign the IP address 154 to the mobile device 102 to complete the handoff procedure. When the first IP address does not match the second IP address, the method 500 may include communicating with a DHCP server to obtain a third IP address, at 510, and assigning the third IP address to the mobile device, at 512. For example, referring to FIG. 1, the second AP 106 may communicate with the DHCP server 110 to receive a third (e.g., "new") IP address and assign the third IP address to the mobile device 102. Thus, when a requested IP address matches a previously assigned IP address, the method 500 enables an access point (AP) to assign a mobile device an IP address during a handoff procedure without communicating with a DHCP server. A completion time of the handoff procedure may be reduced by use of the method 500 as compared to using a DHCP server to assign the IP address during the handoff procedure.

Figure 6:
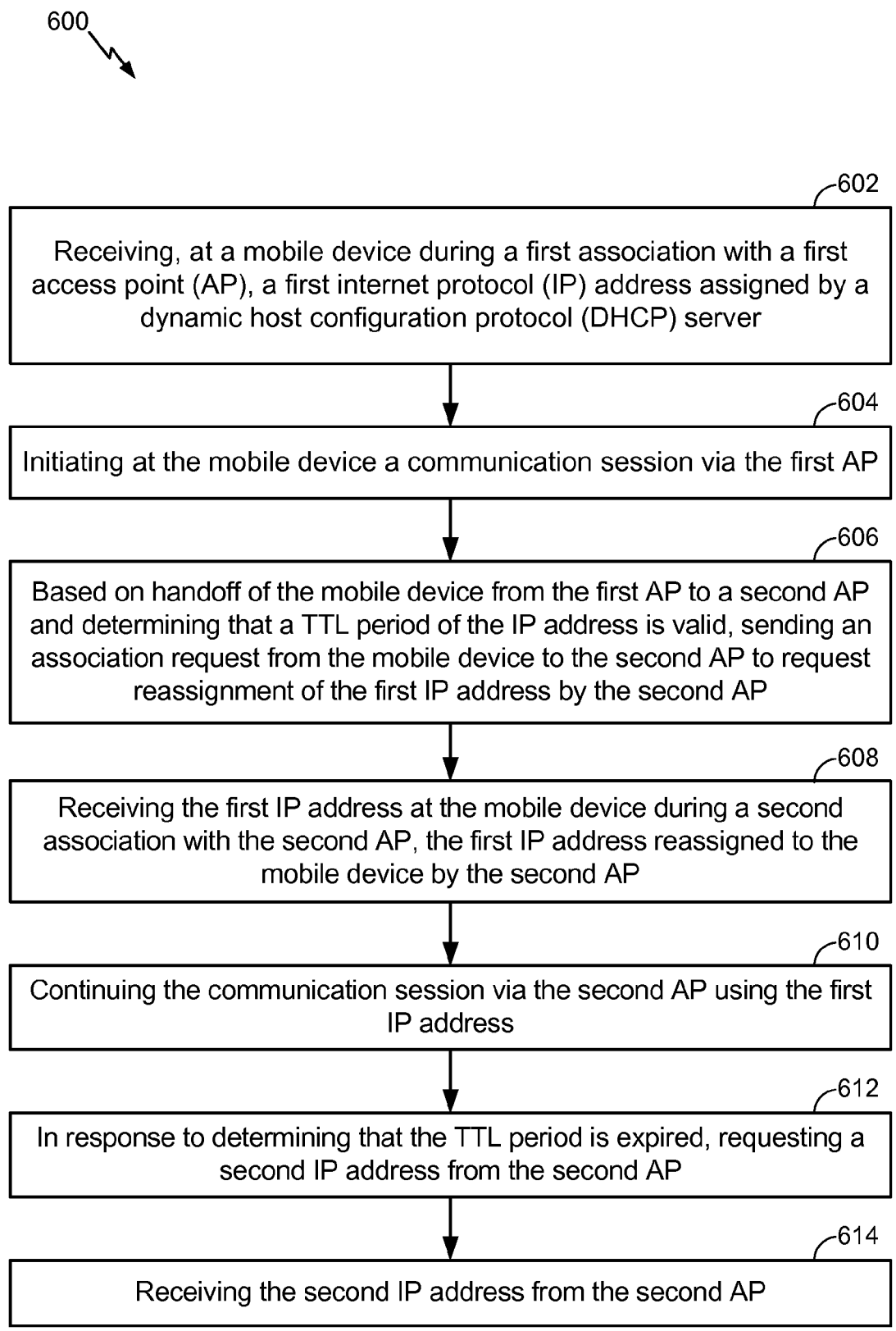
FIG. 6 is a flowchart to illustrate a particular embodiment of a method of operation at a mobile device of FIG. 1.

FIG. 6 illustrates a particular embodiment of a method 600 of operation at a mobile device (e.g., the mobile device 102 of FIG. 1). The method 600 includes receiving, at a mobile device during a first association with a first access point (AP), a first internet protocol (IP) address assigned by a dynamic host configuration protocol (DHCP) server, at 602. For example, referring to FIG. 1, the DHCP server 110 may assign the IP address 154 to the mobile device 102 via the connection 156.

The method 600 includes initiating, at the mobile device, a communication via the first AP, at 604. The method 600 also includes, based on handoff of the mobile device from the first AP to a second AP and determining that a time to live (TTL) period of the IP address is valid, sending an association request from the mobile device to the second AP to request reassignment of the first IP address by the second AP, at 606. For example, referring to FIG. 1, the mobile device 102 may request a reassignment of the IP address 154 from the second AP 106 during handoff of the mobile device from the first AP 104 to the second AP 106. The method 600 may also include receiving the first IP address at the mobile device during a second association with the second AP, where the first IP address is reassigned to the mobile device by the second AP, at 608. For example, when the second AP 106 determines that the particular IP address matches the IP address 154, the second AP 106 may reassign the IP address 154 to the mobile device 102 to complete the handoff procedure. The method 600 includes continuing the communication session via the second AP using the first IP address, at 610.

The method 600 further includes, in response to determining that the TTL period has expired, requesting a second IP address from the second AP, at 612, and receiving the second IP address from the second AP, at 614. For example, referring to FIG. 1, after the TTL period of the IP address 154 has expired, the mobile device 102 may request and receive an assignment of a second IP address from the second AP 106. The second IP address may be the same as the first IP address (e.g., the mobile device is reassigned the first IP address with a reset TTL) or the second IP address may be different from the first IP address.

In an illustrative embodiment, the mobile device requests the first IP address, the second IP address, or both via an association request message. The IP address(es) may be communicated via an AAA message, an EAP message, a RADIUS message, or a combination thereof. Moreover, in a particular embodiment, the mobile device may communicate with the first AP using a cellular connection or a connection compliant with an IEEE standard (e.g., an IEEE 802.11 connection). The mobile device may also communicate with the second AP using a connection compliant with an IEEE standard.

Thus, the method 600 enables a mobile device to be assigned an IP address by an AP during a handoff procedure without communicating with a DHCP server. A completion time of the handoff procedure may be reduced by use of the method 600 as compared to using a DHCP server to assign the IP address during the handoff procedure.

Figure 7:
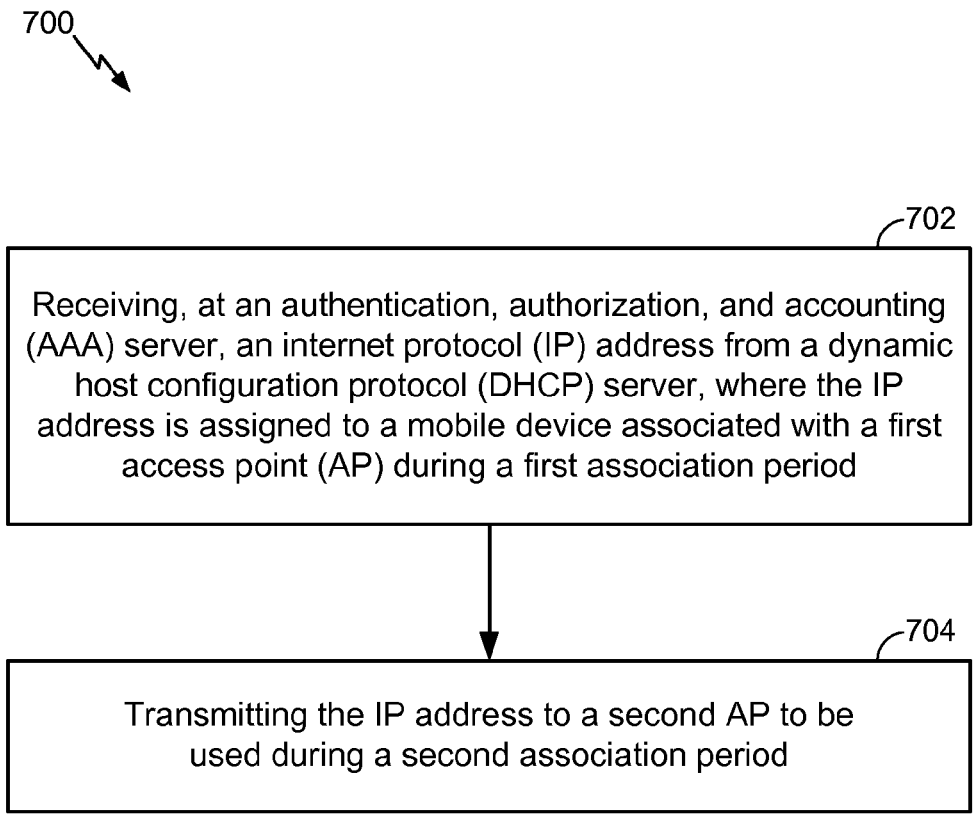
FIG. 7 is a flowchart to illustrate a particular embodiment of a method of operation at an AAA server of FIG. 1.

FIG. 7 illustrates a particular embodiment of a method 700 of operation at an AAA server (e.g., the AAA server 108 of FIG. 1). The method 700 includes receiving, at an authentication, authorization, and accounting (AAA) server, an internet protocol address from a device, at 702. The IP address is assigned to a mobile device associated with a first access point (AP) during a first association period. For example, referring to FIG. 1, the AAA server 108 may obtain the IP address 154 from the DHCP server 110. The DHCP server 110 may assign an IP address 154 to the mobile device 102 via the connection 156 during the first association period.

The method 700 also includes transmitting the IP address to a second AP to be used during a second association period, at 704. For example, the second AP 106 may obtain the IP address 154 from the AAA server 108. Thus, the method 700 enables an AAA server to transmit an IP address to an AP to enable the AP to perform IP address assignment during a handoff procedure. A completion time of the handoff procedure may be reduced by use of the method 700 as compared to using a DHCP server to assign the IP address during the handoff procedure.

Figure 8:
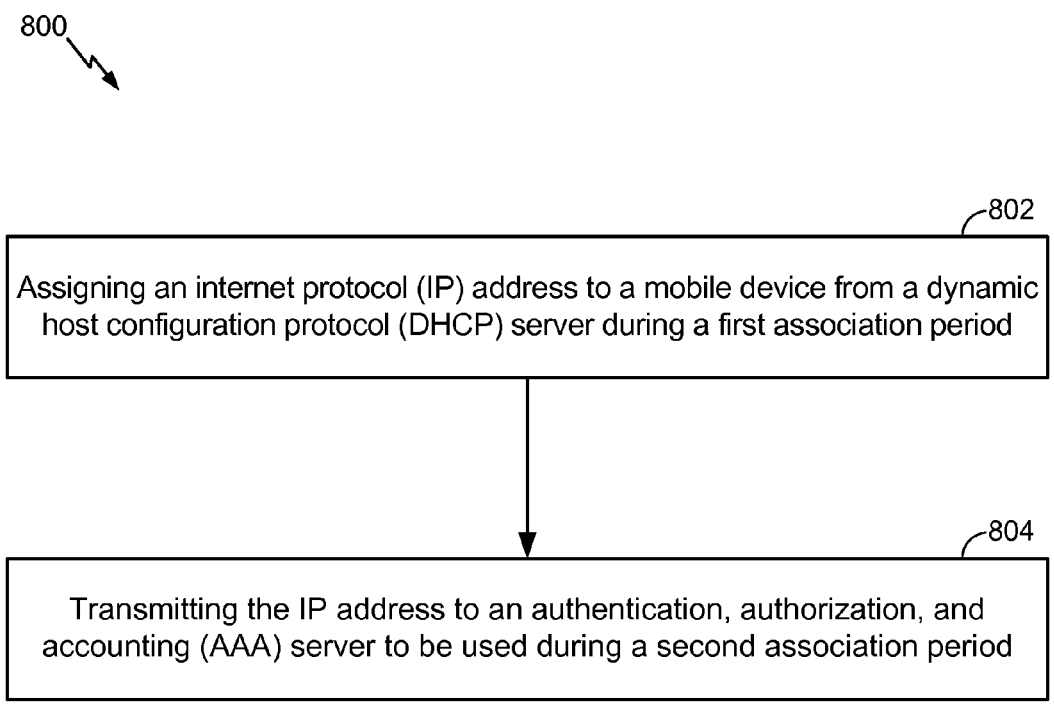
FIG. 8 is a flowchart to illustrate a particular embodiment of a method of operation at a DHCP server of FIG. 1.

FIG. 8 is a flowchart to illustrate a particular embodiment of a method 800 of operation at a DHCP server (e.g., the DHCP server 110 of FIG. 1). The method 800 includes assigning an internet protocol (IP) address to a mobile device from a dynamic host configuration protocol (DHCP) server during a first association period, at 802. For example, referring to FIG. 1, the DHCP server 110 may assign an IP address 154 to the mobile device 102 via the connection 156.

The method 800 also includes transmitting the IP address to an authentication, authorization, and accounting (AAA) server to be used during a second association period, at 804. For example, referring to FIG. 1, the AAA server 108 may obtain the IP address 154 from the DHCP server 110. Thus, the method 800 enables a DHCP server to forward an IP address to an AAA server, so that the AAA server may forward the IP address to an AP to be assigned by the AP during a handoff procedure. A completion time of the handoff procedure may be reduced by use of the method 800 as compared to using a DHCP server to assign the IP address during the handoff procedure.

Figure 9:
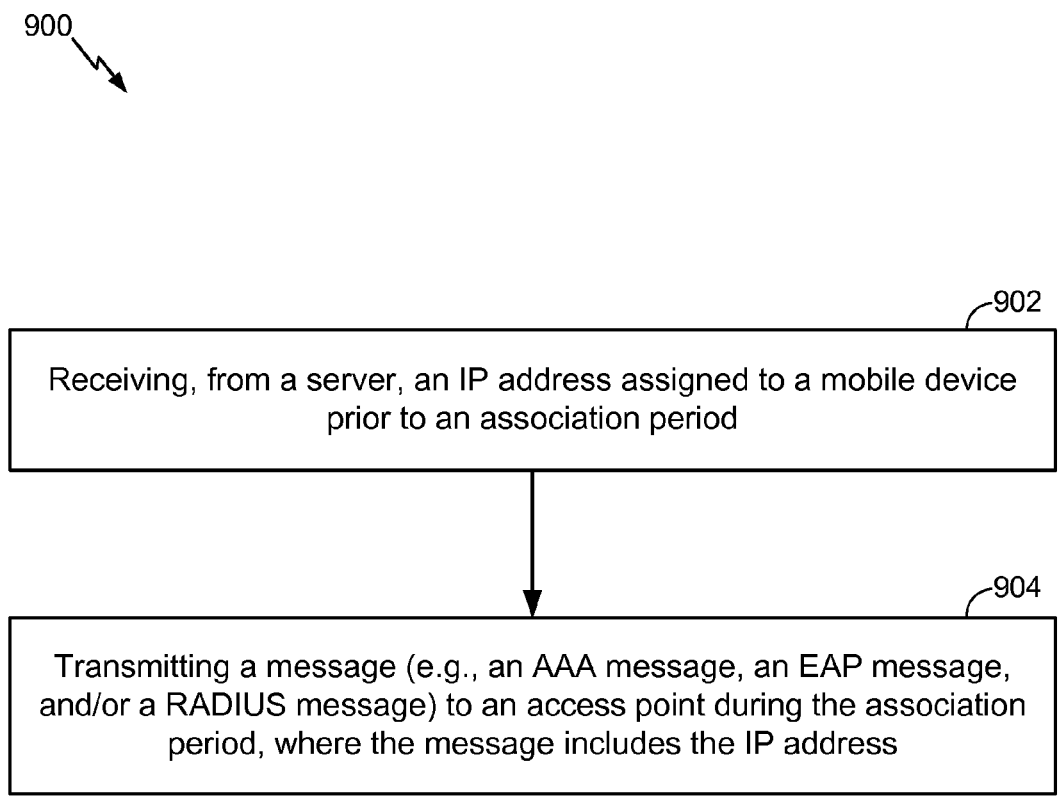
FIG. 9 is a flowchart to illustrate another particular embodiment of a method of operation at an AAA server of FIG. 1.

FIG. 9 illustrates another particular embodiment of a method 900 of operation at a server (e.g., the AAA server 108 of FIG. 1). The method 900 includes receiving, from a server, an IP address assigned to a mobile device prior to an association period, at 902. For example, referring to FIG. 1, the AAA server 108 may receive the IP address 154 from the DHCP server 110.

The method 900 also includes transmitting a message to an access point during the association period, at 902. In an illustrative embodiment, the message may be an AAA message, an EAP message, a RADIUS message, or any combination thereof. The message includes the IP address assigned to the mobile device prior to the association period. For example, referring to FIG. 1, the AAA server 108 may include both the IP address 154 and the identification information of the mobile device 102 in the message. Thus, the method 900 enables an AAA server to transmit an IP address to an AP, so that the AP may assign the IP address during a handoff procedure. A completion time of the handoff procedure may be reduced by use of the method 900 as compared to using a DHCP server to assign the IP address during the handoff procedure.

Figure 10:
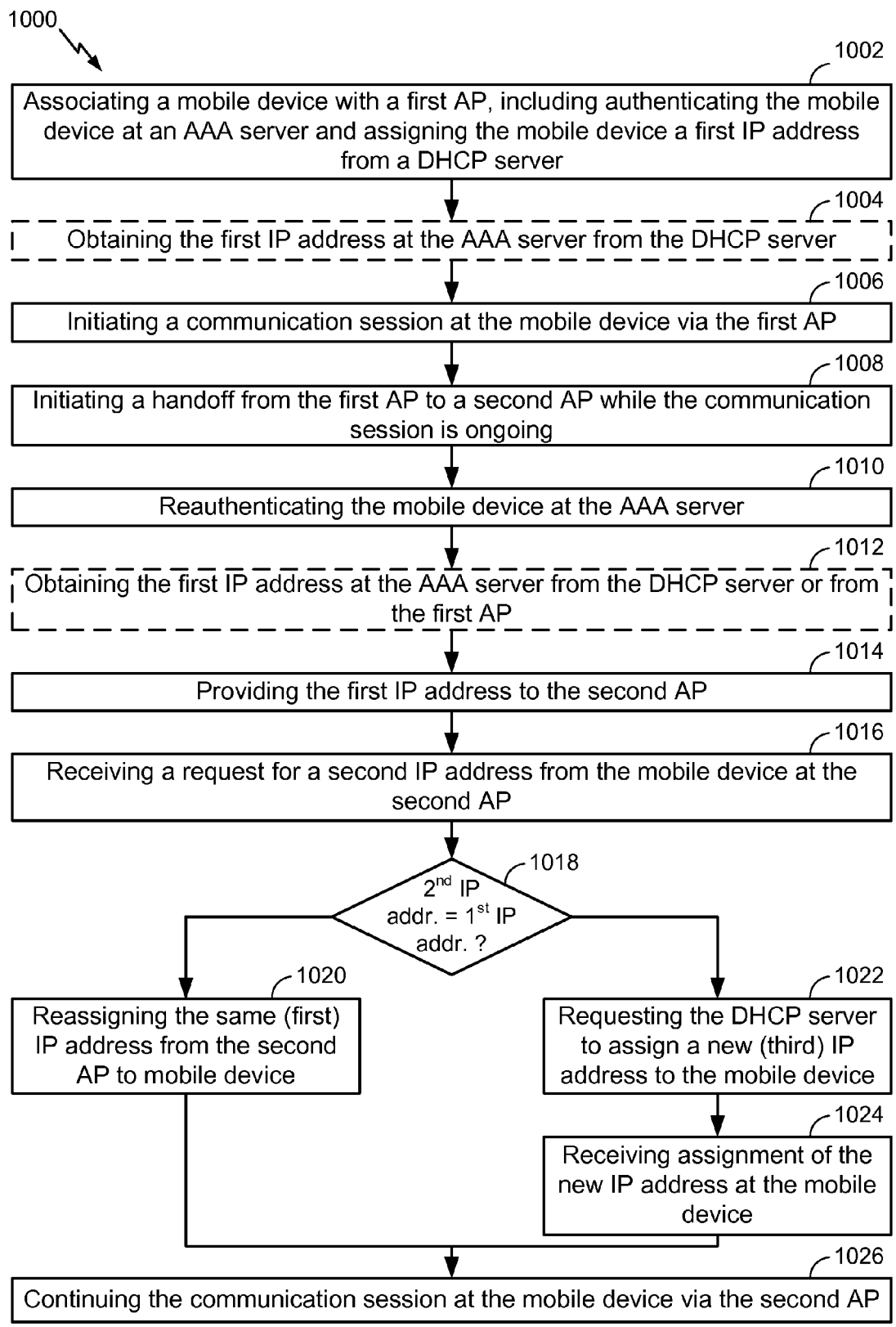
FIG. 10 is a flowchart to illustrate particular embodiments of methods of operation at the system of FIG. 1 in accordance with the messaging flows of FIGS. 2-4.

FIG. 10 illustrates a particular embodiment of a method 1000 of operation at the system 100 of FIG. 1. The method 1000 may correspond to the messaging flows of FIGS. 2-4. The method 1000 includes associating a mobile device with a first AP, at 1002. The mobile device is authenticated at an AAA server and is assigned a first IP address from a DHCP server. For example, the mobile device 102 may associate with the first AP 104 during a first association period. To illustrate, the mobile device 102 may receive a beacon or probe response message from the first AP 104, as shown at 202, and the mobile device 102 may associate with the first AP 104 based on information in the received beacon or probe response message. The AAA server 108 may authenticate the mobile device 102, as shown at 204-206, and the DHCP server may assign the mobile device 102 a first IP address, as shown at 208.

The method 1000 may also include obtaining the first IP address at the AAA server from the DHCP server, at 1004. For example, the AAA server 108 may obtain the first IP address from the DHCP server 110, as shown at 210-212. In FIG. 10, the step 1004 is shown in dashed lines and may be optional (e.g., the AAA server may instead obtain the first IP address at another time, as further described herein).

The method 1000 further includes initiating a communication session at the mobile device via the first AP, at 1006. For example, the mobile device 102 may initiate a communication session (e.g., a VOIP call, a video call, a data connection, etc.) via the first AP 104 using the first IP address, as shown at 214.

The method 1000 includes initiating a handoff from the first AP to a second AP while the communication session is ongoing, at 1008. For example, the mobile device 102 may approach an edge of a coverage area of the first AP 104, where a signal strength of the second AP 106 is stronger than a signal strength of the first AP 104. The mobile device 102 may be aware of the second AP 106 based on neighbor information received in a beacon or probe response message from the first AP 104, at 202, or based on a beacon or probe response received from the second AP 106, at 216. Thus, the mobile device 102 may send a reauthentication request to the second AP 106, as shown at 218, and the second AP 106 may send a reauthentication request to the AAA server 108, as shown at 220.

The method 1000 further includes reauthenticating the mobile device at the AAA server, at 1010. For example, the AAA server 108 may reauthenticate the mobile device 102 and send the second AP 106 a reauthentication response, as shown at 222. In a particular embodiment, the reauthentication response includes the first IP address, which was previously assigned to the mobile device 102 and which was obtained by the AAA server, at 1004. To illustrate, the method 1000 may include obtaining the first IP address at the AAA server from the DHCP server or from the first AP, at 1012. Obtaining the first IP address from the DHCP server 110 may involve the messaging flows 302-304 and/or 402. Obtaining the first IP address from the first AP 104 may involve the messaging flows 306-308. Providing the first IP address to the second AP 106 may involve the messaging flows 222 and/or 404.

The method 1000 includes providing the first IP address to the second AP, at 1014. For example, the AAA server 108 may provide the first IP address to the second AP 106 using the messaging flows 222 and/or 404. The method 1000 also includes receiving a request for a second IP address from the mobile device at the second AP, at 1016. For example, after reauthentication is completed, at 224, the second AP 106 may receive a request from the mobile device 102 for a second IP address, as shown at 226. When the TTL of the first IP address is valid, the mobile device 102 may request reassignment of the first IP address (i.e., may indicate a desire to continue using the first IP address while being associated with the second AP 106). Alternatively, if the TTL of the first IP address has expired, the mobile device 102 may request a different IP address from the second AP 106.

Continuing to 1018, the method 1000 includes determining at the second AP whether the second IP address being requested by the mobile device matches the first IP address that was previously assigned to the mobile device, at 1002. If the second IP address matches the first IP address, the method 1000 includes the second AP reassigning the (same) first IP address to the mobile device, at 1020. For example, the second AP 106 may determine that the second IP address and the first IP address match, as shown at 228, and may reassign the first IP address to the mobile device 102, as shown at 230. The method 1000 also includes the mobile device continuing the communication session via the second AP, at 1026. For example, the mobile device 102 may continue the communication session (e.g., VOIP call, video call, data connection etc.) using the reassigned first IP address via the second AP 106, as shown at 232.

Alternatively, the second AP may determine that the second IP address does not match the first IP address. When the second IP address does not match the first IP address, the method 1000 includes requesting the DHCP server to assign a "new" (e.g., third) IP address to the mobile device, at 1022. For example, the second AP 106 may determine that the second IP address does not match the first IP address, as shown at 406, and the second AP 106 request the DHCP server to assign a new IP address to the mobile device 102, as shown at 408. The method 1000 also includes receiving assignment of the "new" IP address at the mobile device at 1024. For example, the mobile device 102 may receive the assignment of the "new" IP address from the DHCP server 110, as shown at 410. Alternatively, the DHCP server 110 may send the "new" IP address to the second AP 106, as shown at 412, and the second AP 106 may forward the "new" IP address to the mobile device 102, as shown at 414. Continuing to 1026, the mobile device 102 may continue the communication session (e.g., VOIP call, video call, data connection etc.) using the "new" IP address via the second AP 106, as shown at 416.

Figure 11:
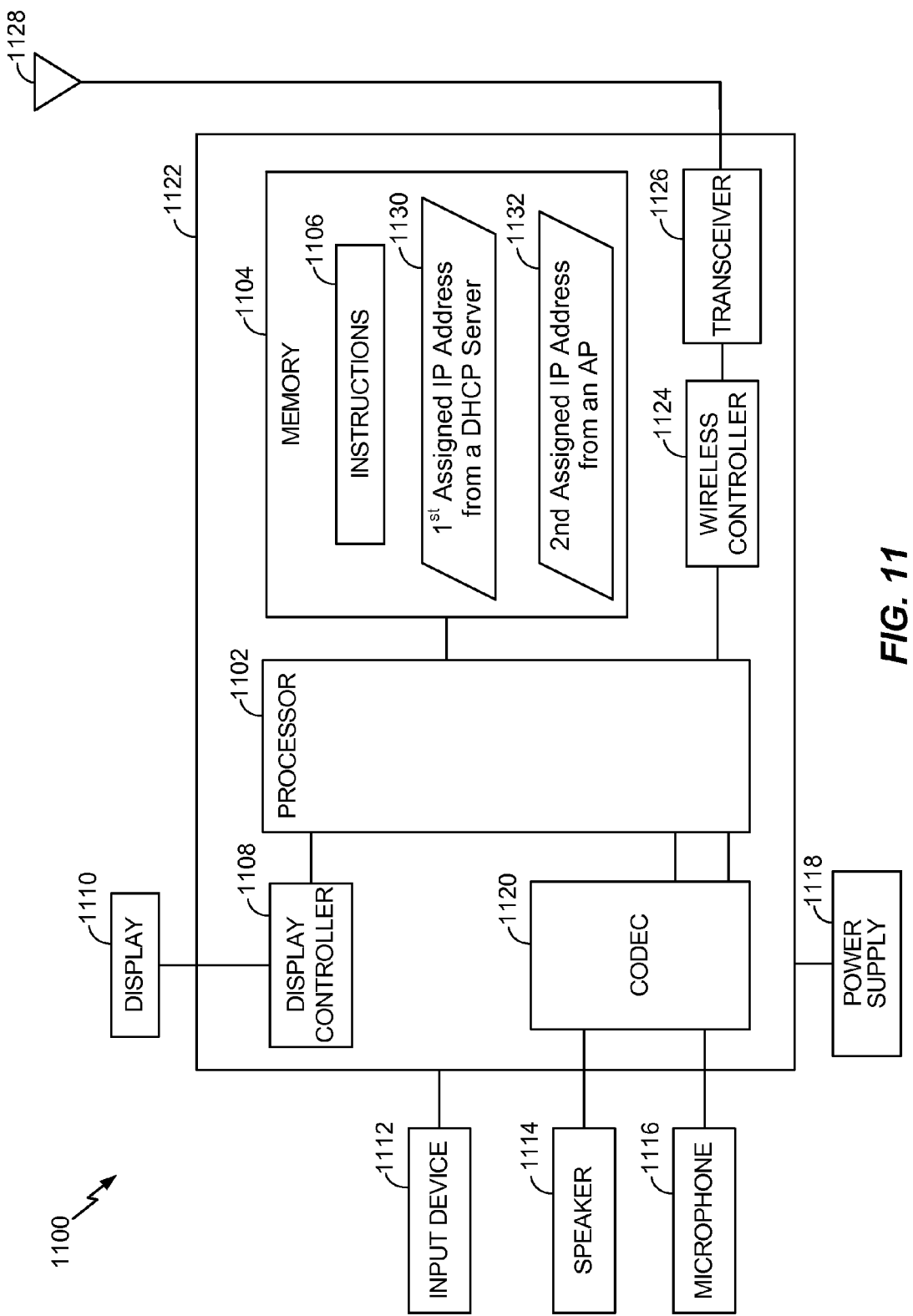
FIG. 11 is a block diagram of a communication device including components that are operable to receive an assignment of IP address from an AP of FIG. 1 during a handoff procedure.

FIG. 11 is a block diagram of a communication device 1100 including components that are operable to receive an assignment of IP address from an AP (e.g., the second AP 106) of FIG. 1 during a handoff procedure. In an illustrative embodiment, the communication device 1100 may be the mobile device 102 of FIG. 1. In another illustrative embodiment, the communication device 1100, or components thereof, include or are included within the mobile device 102. Further, all or part of the method described in FIG. 5 may be performed at or by the communication device 1100 when the communication device 1100 is implemented as a mobile device (e.g., the mobile device 102). All or part of the method described in FIG. 6 may be performed at or by the communication device 1100 when the communication device 1100 is implemented as an AP (e.g., the second AP 106). All or part of the method described in FIGS. 7 and 9 may be performed at or by the communication device 1100 when the communication device 1100 is implemented as an AAA server (e.g., the AAA server 108). All or part of the method described in FIG. 8 may be performed at or by the communication device 1100 when the communication device 1100 is implemented as a DHCP server (e.g., the DHCP server 110).

The communication device 1100 may include a processor 1102 (e.g., a digital signal processor) coupled to a memory 1104. The memory 1104 may be a non-transitory tangible computer-readable and/or processor-readable storage device that stores instructions 1106. The instructions 1106 may be executable by the processor 1102 to perform one or more functions or methods described herein, such as the method described with reference to FIG. 5 when the communication device 1100 is implemented as a mobile device (e.g., the mobile device 102). The instructions 1106 may be executable by the processor 1102 to perform the method described with reference to FIG. 6 when the communication device 1100 is implemented as an AP (e.g., the second AP 106). The instructions 1106 may be executable by the processor 1102 to perform the method described with reference to FIGS. 7 and 9 when the communication device 1100 is implemented as an AAA server (e.g., the AAA server 108). The instructions 1106 may be executable by the processor 1102 to perform the method described with reference to FIG. 8 when the communication device 1100 is implemented as a DHCP server (e.g., the DHCP server 110). The instructions 1106 may also be executable by the processor 1102 to perform at least a portion of the method 1000 of FIG. 10. In a particular embodiment, the processor 1102 may include a signal detector, as further described with reference to FIG. 18.

The memory 1104 may also include a first assigned IP address 1130. The first assigned IP address 1130 may be an IP address assigned to the communication device 1100 by a DHCP server during a first association period. For example, the first assigned IP address 1130 may be the IP address 154 of FIG. 1. The memory 1104 may further include a second assigned IP address 1132. The second assigned IP address 1132 may be an IP address assigned to the communication device 1100 by an AP during a second association period. For example, the second assigned IP address 1132 may be the IP address 154 or another IP address (e.g., when a TTL period of the IP address 154 has elapsed).

FIG. 11 shows that the communication device 1100 may also include a display controller 1108 that is coupled to the processor 1102 and to a display device 1110. A coder/decoder (CODEC) 1120 can also be coupled to the processor 1102. A speaker 1114 and a microphone 1116 can be coupled to the CODEC 1120. FIG. 11 also indicates that a wireless controller 1124 may be coupled to the processor 1102, where the wireless controller 1124 is in communication with an antenna 1128 via a transceiver 1126. In a particular embodiment, the transceiver 1126 includes or is coupled to a radio frequency (RF) interface, as further described with reference to FIG. 18. The wireless controller 1124, the transceiver 1126, and the antenna 1128 may thus represent a wireless interface that enables wireless communication by the communication device 1100. For example, in an embodiment where the communication device 1100 is the mobile device 102, such a wireless interface may be used to communicate with the first AP 104, the second AP 106, or the DHCP server 110 of FIG.

1. The communication device 1100 may include numerous wireless interfaces, where different wireless networks are configured to support different networking technologies or combinations of networking technologies. For example, the communication device 1100 may include an IEEE wireless interface and/or a cellular interface.

In a particular embodiment, the processor 1102, the display controller 1108, the memory 1104, the CODEC 1120, the wireless controller 1124, the transceiver 1126, are included in a system-in-package or system-on-chip device 1122. In a particular embodiment, an input device 1112 and a power supply 1118 are coupled to the system-on-chip device 1122. Moreover, in a particular embodiment, as illustrated in FIG. 11, the display device 1110, the input device 1112, the speaker 1114, the microphone 1116, the antenna 1128, and the power supply 1118 are external to the system-on-chip device 1122. However, each of the display device 1110, the input device 1112, the speaker 1114, the microphone 1116, the antenna 1128, and the power supply 1118 can be coupled to a component of the system-on-chip device 1122, such as an interface or a controller.

One or more components of the communication device 1100 or components analogous thereto, may be integrated into a wireless device, such as the mobile device 102. For example, the mobile device 102 may include a wireless controller, a transceiver, an antenna, a processor, and a memory storing instructions executable by a processor to perform all or part of the method of FIG. 5 and/or the method of FIG. 10.

One or more components of the communication device 1100 or components analogous thereto, may be integrated into an AP, such as the second AP 106. For example, the second AP 106 may include a wireless controller, a transceiver, an antenna, a processor, and a memory storing instructions executable by a processor to perform all or part of the method of FIG. 6 and/or the method of FIG. 10.

One or more components of the communication device 1100 or components analogous thereto, may be integrated into an AAA server, such as the AAA server 108. For example, the AAA server 108 may include a wireless controller, a transceiver, an antenna, a processor, and a memory storing instructions executable by a processor to perform all or part of one or more of the methods of FIG. 7, FIG. 9, and FIG. 10.

One or more components of the communication device 1100 or components analogous thereto, may be integrated into a DHCP server, such as the DHCP server 110. For example, the DHCP server 110 may include a wireless controller, a transceiver, an antenna, a processor, and a memory storing instructions executable by a processor to perform all or part of the method of FIG. 8 and/or the method of FIG. 10.

In conjunction with the described embodiments, an apparatus may include means for receiving. The means for receiving is configured to receive, at a mobile device, during a first association with a first access point (AP), a first assignment of an internet protocol (IP) address by a dynamic host configuration protocol (DHCP) server. The means for receiving is also configured to receive, at the mobile device, during a second association with a second AP, a second assignment of the IP address by the second AP. For example, the means for receiving may include one or more components (e.g., a receiver) of the mobile device 102, the wireless controller 1124 of FIG. 11, the transceiver 1126, the antenna 1128, one or more devices configured to receive data, or a combination thereof. The apparatus may also include means for communicating with a server. For example, the means for communicating with a server may include one or more components (e.g., the processor 112) of the mobile device 102, the processor 1102, the wireless controller 1124, the transceiver 1126, the antenna 1128, one or more devices configured to communicate with a server, or a combination thereof.

A second apparatus may include means for receiving. The means for receiving is configured to receive, at an access point (AP), an association request from a mobile device. The association request includes a first internet protocol (IP) address. The means for receiving is also configured to receive, at the AP, a second IP address from a server. For example, the means for receiving may include one or more components (e.g., a receiver) of the first AP 104, one or more components (e.g., a receiver) of the second AP 106, one or more devices configured to receive data, or a combination thereof. The second apparatus may also include means for assigning. The means for assigning is configured to assign the first IP address to the mobile device in response to a determination that the first IP address matches the second IP address. For example, the means for assigning may include one or more components (e.g., the processor 118) of the first AP 104, one or more components (e.g., the processor 136) of the second AP 106, one or more devices configured to assign an IP address, or a combination thereof.

A third apparatus may include means for assigning an internet protocol (IP) address to a mobile device from a dynamic host configuration protocol (DHCP) server during a first association period. For example, the means for assigning may include one or more components (e.g., the processor 130) of the DHCP server 110, one or more devices configured to assign an IP address, or a combination thereof. The third apparatus may also include means for transmitting the IP address to an authentication, authorization, and accounting (AAA) server to be used during a second association period. The means for transmitting may include one or more components (e.g., a transmitter) of the DHCP server 110, one or more devices configured to transmit data, or a combination thereof.

A fourth apparatus may include means for receiving, at an authentication, authorization, and accounting (AAA) server, an internet protocol address from a device. The IP address is assigned to a mobile device associated with a first access point (AP) during a first association period. For example, the means for receiving may include one or more components (e.g., a receiver) of the AAA server, one or more devices configured to receive data, or a combination thereof. The fourth apparatus may also include means for transmitting the IP address to a second AP to be used during a second association period. For example, the means for transmitting may include one or more components (e.g., a transmitter) of the AAA server 108, one or more devices configured to transmit data, or a combination thereof.

A fifth apparatus may include means for transmitting an authentication, authorization, and accounting (AAA)-Extensible Authentication Protocol (EAP)-Answer message from an AAA server to an access point during an association period. The AAA-EAP-Answer message includes an internet protocol (IP) address assigned to a mobile device prior to the association period. For example, the means for transmitting may include one or more components (e.g., a transmitter) of the AAA server 108, one or more devices configured to transmit data, or a combination thereof. The fifth apparatus may also include means for communicating with a device. For example, the means for communicating may include one or more components (e.g., a processor) of the AAA server 108, the processor 124, the wireless controller 1124, the transceiver 1126, the antenna 1128, one or more devices configured to communicate with a device, or a combination thereof.

Thus, FIGS. 1-11 illustrate certain example techniques for reducing latency in a wireless communication system. Alternatively or in addition to the examples of FIGS. 1-11, latency in a wireless communication system can be reduced using one or more techniques illustrated with reference to FIGS. 12-18, such as by utilizing an indication that identifies whether a mobile device may avoid certain DHCP reconfiguration operations.

Figure 12:
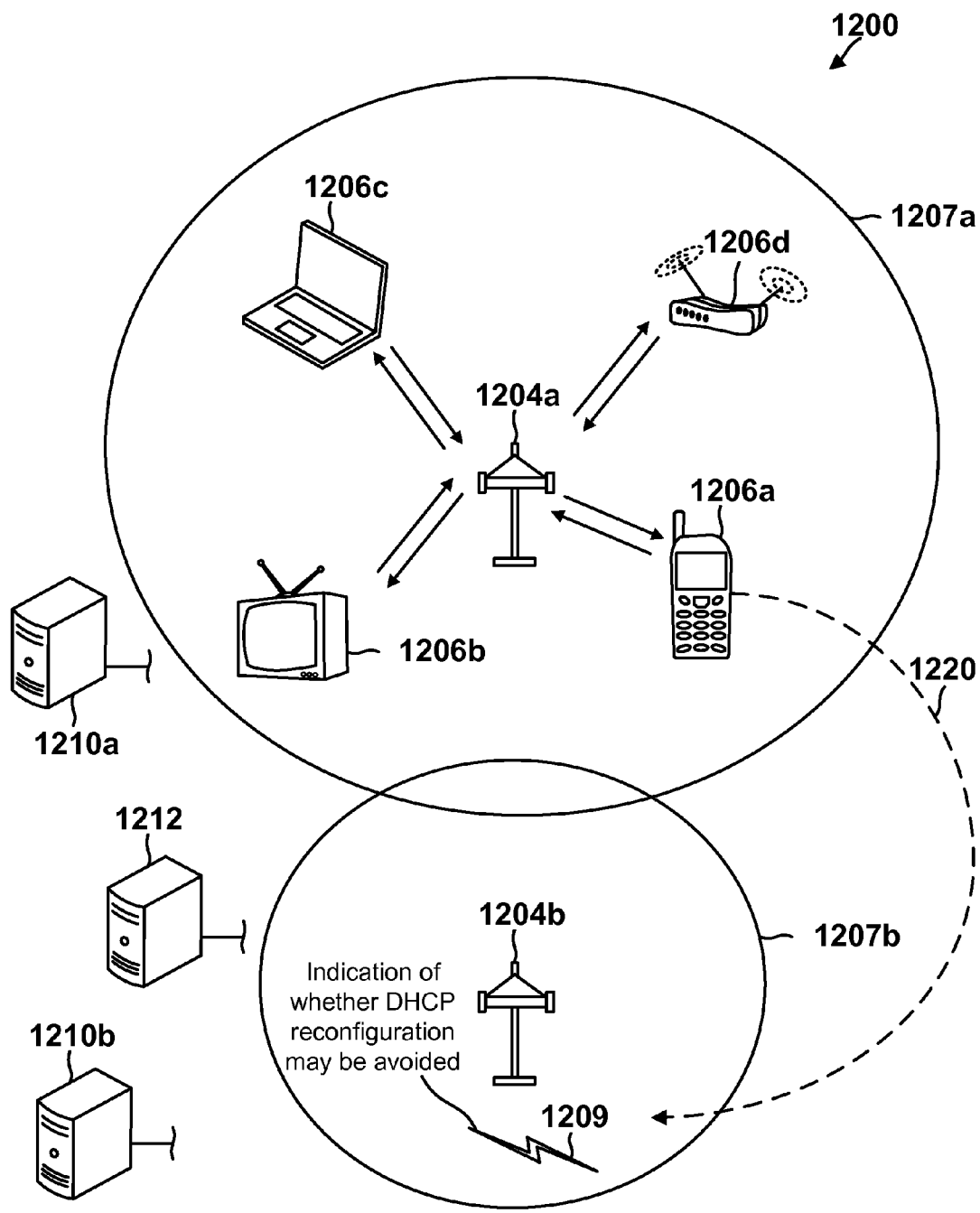
FIG. 12 is a diagram to illustrate a particular embodiment of a system operable to transmit an indication to a mobile device indicating whether DHCP reconfiguration can be avoided.

FIG. 12 shows an example of a wireless communication system 1200 in which aspects of the present disclosure can be employed. Certain components and operations of the wireless communication system 1200 include an access point (AP) 1204a, which communicates with one or more mobile devices, such as stations (STAs) 1206a-1206d, in a basic service area (BSA) 1207a. The wireless communication system 1200 can further include an AP 1204b which can communicate within a particular range, such as a BSA 1207b. One or more STAs 1206 can move in and/or out of the BSAs 1207a-1207b. In various embodiments described herein, the STAs 1206 and 1206a-1206d can be configured to quickly establish wireless links with the AP 1204a and/or 1204b, particularly when moving into the BSAs 1207a and/or 1207b.

The APs 1204a-b may communicate with one or more dynamic host configuration protocol (DHCP) servers that manage certain Internet Protocol (IP) communications within the BSAs 1207a-b. For example, a DHCP server 1210a may distribute network configuration parameters, such as IP addresses, to mobile devices, such as the STAs 1206a-d via the AP 1204a. The APs 1204a-b may each communicate with a common server, such as the DHCP server 1210a. Alternatively, the AP 1204b may communicate with another DHCP server, such as a DHCP server 1210b.

A device of FIG. 12 may communicate using a fast initial link setup (FILS) technique that utilizes an indication 1209 to indicate whether APs correspond to (e.g., are managed by) a common DHCP server or different DHCP servers. To illustrate, the STA 1206a may communicate with the AP 1204a. Communicating with the AP 1204a may include requesting DHCP information (e.g., an IP address) from the DHCP server 1210a via the AP 1204a while establishing wireless connectivity with the AP 1204a (e.g., during "link setup" with the AP 1204a). If a user of the STA 1206a leaves the BSA 1207a and enters the BSA 1207b (represented in FIG. 12 by a path 1220), the STA 1206a may terminate communications with the AP 1204a and may initiate communications with the AP 1204b using a link setup procedure to establish connectivity with the AP 1204a (e.g., by registering with the AP 1204b, performing authentication and/or association procedures via the AP 1204b, performing one or more other operations to establish wireless connectivity, etc.).

In accordance with the present disclosure, the AP 1204b may send an indication 1209 to the STA 1206a specifying whether the STA 1206a is able to communicate with the AP 1204b using the DHCP information. To illustrate, if the APs 1204a-b are each managed by a common DHCP server (e.g., the DHCP server 1210a), then the APs 1204a-b may "recognize" common DHCP credentials (i.e., may each use the same set or "pool" of IP addresses). Link setup between the STA 1206a and the AP 1204b may include an authentication process that includes communicating with a server 1212 during the authentication process. The server 1212 may correspond to an authentication server (AS) and/or a server that operates in accordance with an Extensible Authentication Protocol (EAP), such as an EAP re-authentication (ER) server, as illustrative examples. Certain authentication protocols (e.g., an EAP-compliant authentication procedure) may specify that information associated with the AP 1204a, such as an EAP network address identifier (NAI), is to be transmitted by the STA 1206a to the server 1212 during link setup with the AP 1204b to authenticate the STA 1206a.

During the authentication process, the server 1212 may determine that the STA 1206a has moved between APs of a common network and that DHCP reconfiguration may be avoided. For example, the server 1212 may parse contents of communications sent by the STA 1206a to the AP 1204b during the authentication process to identify information associated with the AP 1204a, such as the NAI. In this case, the server 1212 may provide the same network flag to the AP 1204b indicating DHCP reconfiguration may be avoided, and the indication 1209 may have a value indicating that DHCP reconfiguration can be avoided. In other cases, the indication 1209 may have another value. For example, if the APs 1204a-b are associated with different DHCP servers (e.g., the DHCP servers 1210a-b, respectively), then the indication 1209 may have a value indicating that DHCP reconfiguration is to be performed by the STA 1206a (e.g., by sending a DHCP request to the DHCP server 1210b via the AP 1204b).

The techniques of FIG. 12 may reduce latency of communications within the wireless communication system 1200. For example, based on the indication 1209, a mobile device (such as the STA 1206a) may avoid DHCP reconfiguration. Instead, the mobile device may initiate IP communications (e.g., sending and/or receiving email, videos, pictures, etc.) sooner as compared to a system in which DHCP reconfiguration is performed automatically during each link setup procedure.

The various fast initial link setup (FILS) implementations described herein can provide enhanced system performance under a variety of use conditions. In some embodiments, when a mobile device transitions from one access point to another, the mobile device prefers an authentication and association process with the new access point. A portion of the authentication and association process includes a request for a new IP address that may be used for IP communication via the new access point. This request for a new IP address may add additional latency to the authentication and association process, delaying establishment of IP communications utilizing the new access point. This request for a new IP address may also contribute to additional network data traffic, increasing utilization of the communication network and contributing to packet collisions.

This request for a new IP address when authenticating and associating with a new access point may be unnecessary under some circumstances. For example, if the new access point provides IP communication via the same IP network as the previous access point, the previous IP address used for IP communication with that access point may be compatible for use with the new access point. In this case, there is no need to request a new IP address.

In some other environments, a mobile device may be authenticating and associating with many access points over a period of time, some of which may provide IP communications services using the same IP network. For example, in one scenario, a mobile user walks down a sidewalk in a large metro area. The mobile user may encounter a variety of merchants, some of which provide IP communications capabilities to their patrons. The IP communications may be set up using FILS procedure, such as via an IEEE 802.11ai technique. As the mobile user come within range of each merchant's access point, their mobile device may perform an authentication and association process. With a conventional technique, each authentication and association process requests a new IP address before communication is established (e.g., before user data can be sent and received).

In some environments, several of these merchants may provide IP communications via a common IP network. For example, three major business Internet providers may maintain dominant market share in the region. In this example, as the mobile user walks down the street, the mobile device may initiate a FILS procedure with each of the three IP networks. To the extent that any one or more of these three IP networks are seen multiple times by the mobile device during the walk, a request for a new IP address within an IP network previously associated with during the walk may be unnecessary.

Some of the embodiments disclosed herein provide an ability for the mobile device to store information relating to previously accessed IP networks. When authenticating and associating with a previously accessed IP network, a previously obtained IP address may be reused, assuming the IP address continues to meet certain quality and other criteria. This may reduce latency in establishing IP communication with a network, while also reducing the amount of network overhead introduced by the mobile device.

Note that while the term "IP network" is used throughout this disclosure, this term may also be used to refer to an IP sub-network or subnet. The subnet to which the term may refer may be part of a single physical subnet or may be distributed over multiple physical subnets.

In various embodiments, the wireless communication system 1200 can include a wireless local area network (WLAN). The WLAN can be used to interconnect nearby devices, employing one or more networking protocols. The various aspects described herein can apply to any communication standard, such as IEEE 802.11 wireless protocols. For example, the various aspects described herein can be used as part of the IEEE 802.11a, 802.11b, 802.11g, 802.11n, 802.11ah, and/or 802.11ai protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access (e.g., for use with hotspots), machine-to-machine (M2M) communications, etc.

The APs 1204a-1204b can serve as a hub or base station for the wireless communication system 1200. For example, the AP 1204a can provide wireless communication coverage in the BSA 1207a, and the AP 1204b can provide wireless communication coverage in the BSA 1207b. The AP 1204a and/or 1204b can include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

The STAs 1206 and 1206a-1206d (collectively referred to herein as STAs 1206) can include a variety of devices such as, for example, laptop computers, personal digital assistants (PDAs), mobile phones, etc. The STAs 1206 can connect to, or associate with, the APs 1204a-1204b via a WiFi (e.g., IEEE 802.11 protocol such as 802.11ai) compliant wireless link to obtain general connectivity to the Internet or to other wide area networks. The STAs 1206 may also be referred to as "clients."

In various embodiments, the STAs 1206 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 1206 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 1204a, along with the STAs 1206a-1206d associated with the AP 1204a, and that are configured to use the AP 1204a for communication, can be referred to as a basic service set (BSS). In some embodiments, the wireless communication system 1200 may correspond to a "distributed" network that does not have a central AP. For example, in some embodiments, the wireless communication system 1200 can function as a peer-to-peer network between the STAs 1206. Accordingly, operations of the AP 1204a described herein can be performed by one or more of the STAs 1206 in some cases. Moreover the AP 1204a can implement one or more aspects described with respect to the STAs 1206, in some embodiments.

A communication link that facilitates transmission from the AP 1204a to one or more of the STAs 1206 can be referred to as a downlink (DL), and a communication link that facilitates transmission from one or more of the STAs 1206 to the AP 1204a can be referred to as an uplink (UL). Alternatively, a downlink can be referred to as a forward link or a forward channel, and an uplink can be referred to as a reverse link or a reverse channel.

A variety of processes and methods can be used for transmissions in the wireless communication system 1200 between the AP 1204a and the STAs 1206. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 1204a and the STAs 1206 in accordance with OFDM/OFDMA processes. Accordingly, the wireless communication system 1200 can be referred to as an OFDM/OFDMA system. As another example, signals can be sent and received between the AP 1204a and the STAs 1206 in accordance with CDMA processes. Accordingly, the wireless communication system 1200 can be referred to as a CDMA system.

Aspects of certain devices (such as the AP 1204a and the STAs 1206) can be used to transmit wireless signals across a relatively long range, for example about one kilometer or longer. As described in greater detail herein, in some embodiments, devices can be configured to establish wireless links faster than devices implementing other wireless protocols.

Generally, in IEEE 802.11 protocols, authentication takes place between a mobile device and an authentication server (e.g., a server that provides authentication services, such as identity verification, authorization, privacy, and non-repudiation). For example, the AP, which functions as an authenticator, relays messages between the mobile device and the authentication server during the authentication process. In some instances, the authentication messages between the mobile device and the AP are transported using extensible authentication protocol over local area network (EAPOL) frames. EAPOL frames may be defined in the IEEE 802.11ai protocol. The authentication messages between the AP and the authentication server may be transported using the remote authentication dial in user service (RADIUS) protocol or the Diameter authentication, authorization, and accounting protocol.

Certain wireless communication techniques that enable fast initial link setup (e.g., in IEEE 802.11ai) may specify that association procedures are to be performed after authentication procedures. Such techniques may cause a delay in wireless communications. Particular examples of authentication and association procedures in a conventional communication system are described to illustrate such delay. In an example conventional link setup procedure, an AP may transmit a beacon that enables "discovery" of the AP by devices. The beacon may be received by a mobile device. After detecting the beacon, the mobile device may initiate an extensible authentication protocol (EAP) authentication with the AP. The AP may perform an authentication procedure with an authentication server to authenticate the mobile device.

During the authentication procedure, the mobile device may transmit an authentication frame to the AP. The authentication frame may be an EAPOL frame that includes an EAP re-authentication initiation message, such as in connection with an EAP Re-authentication Protocol. After receiving the authentication frame from the mobile device, the AP may transmit an authentication request to the authentication server. The authentication request may be an authentication, authorization, and accounting (AAA) EAP Request (e.g., an EAP payload), which may include the EAP re-authentication initiation message.

The authentication server may transmit an authentication answer to the AP in response to the authentication request from the AP. The authentication answer may be an AAA EAP Answer (e.g., an EAP payload), which may include an indication of whether authentication succeeded or failed (i.e., whether or not the mobile device is authenticated). For example, the authentication answer may include an EAP success message or an EAP failure message. The authentication answer may also indicate a pairwise master key (PMK), which may be used by the AP to encrypt data communications.

Upon receiving the authentication answer from the authentication server, the AP may transmit an authentication frame to the mobile device. The authentication frame may be an EAPOL frame and may include an EAP finish-re-authentication message (e.g., which is part of the EAP Re-authentication Protocol), which indicates whether authentication succeeded or failed.

After receiving the authentication frame from the AP, the mobile device may transmit an association request to the AP to initiate association with the AP. The association request may be an EAPOL frame and may include a key confirmation. To associate with the mobile device, the AP may perform a DHCP request/reply exchange with a DHCP server to obtain an IP address for the mobile device to enable the mobile device to perform IP communications via the AP.

To illustrate, the association request sent from the mobile device to the AP may include a DHCP request. The DHCP request may indicate that the AP is to obtain an IP address for use by the mobile device. Upon receiving the association request, the AP may forward the DHCP request to the DHCP server. The DHCP server then allocates an IP address for the mobile device, such as by selecting the IP address from a group of available IP addresses. After the IP address has been selected, the DHCP server transmits a DHCP acknowledgement message to the AP. The DHCP acknowledge message may include an indication of the IP address.

The AP may transmit an association response to the association request to the mobile device. The association response may be an EAPOL frame and may include a key confirmation and/or a group-key distribution, which can be used to encrypt data traffic for data communications. After receiving the association response, the mobile device may transmit and receive IP packets using the IP address (e.g., to browse the Internet, send and receive emails, etc.).

Therefore, an association process between a mobile device and an AP in a conventional communication system may include a DHCP request/response exchange between the AP and the DHCP server. The DHCP request/response exchange may result in latency between transmission of the association request and reception of the association response by the mobile device (e.g., latency while the DHCP server selects the IP address for the mobile device).

In connection with the present disclosure, latency associated with a DHCP request/response may be avoided in certain circumstances. For example, the mobile device may have previously obtained a valid IP address to use for IP communication with a first AP. The IP address may also be compatible with IP communication via a second AP. Accordingly, performing an additional DHCP request/response procedure to obtain a new IP address (when an existing IP address could be used) results in additional latency that may be avoided in some circumstances.

To further illustrate, a mobile device may move across a series of access points located within a particular building. The building may be under the operation of a common entity, such as a corporation. At least a substantial portion of the corporation's IP communication may be performed within a single IP network or a single IP subnet. The IP subnet may be part of a single physical subnet or may be distributed over multiple physical subnets. Therefore, as the mobile device moves within the building and comes under the coverage area of a variety of access points within the building, the mobile device may perform authentication and association with each of the access points. In a conventional communication system, the mobile device may repeatedly request multiple IP addresses by sending DHCP requests to the access points when connecting to each of the access points. However, if each access point within the building performs IP communications using the same IP network or IP subnet, the IP address obtained via association with one access point may be used when performing IP communications with each of the other access points within the building. Therefore, in this example, one or more of the DHCP requests may be avoided by using the IP address for IP communications with each of the access points.

Figure 13:
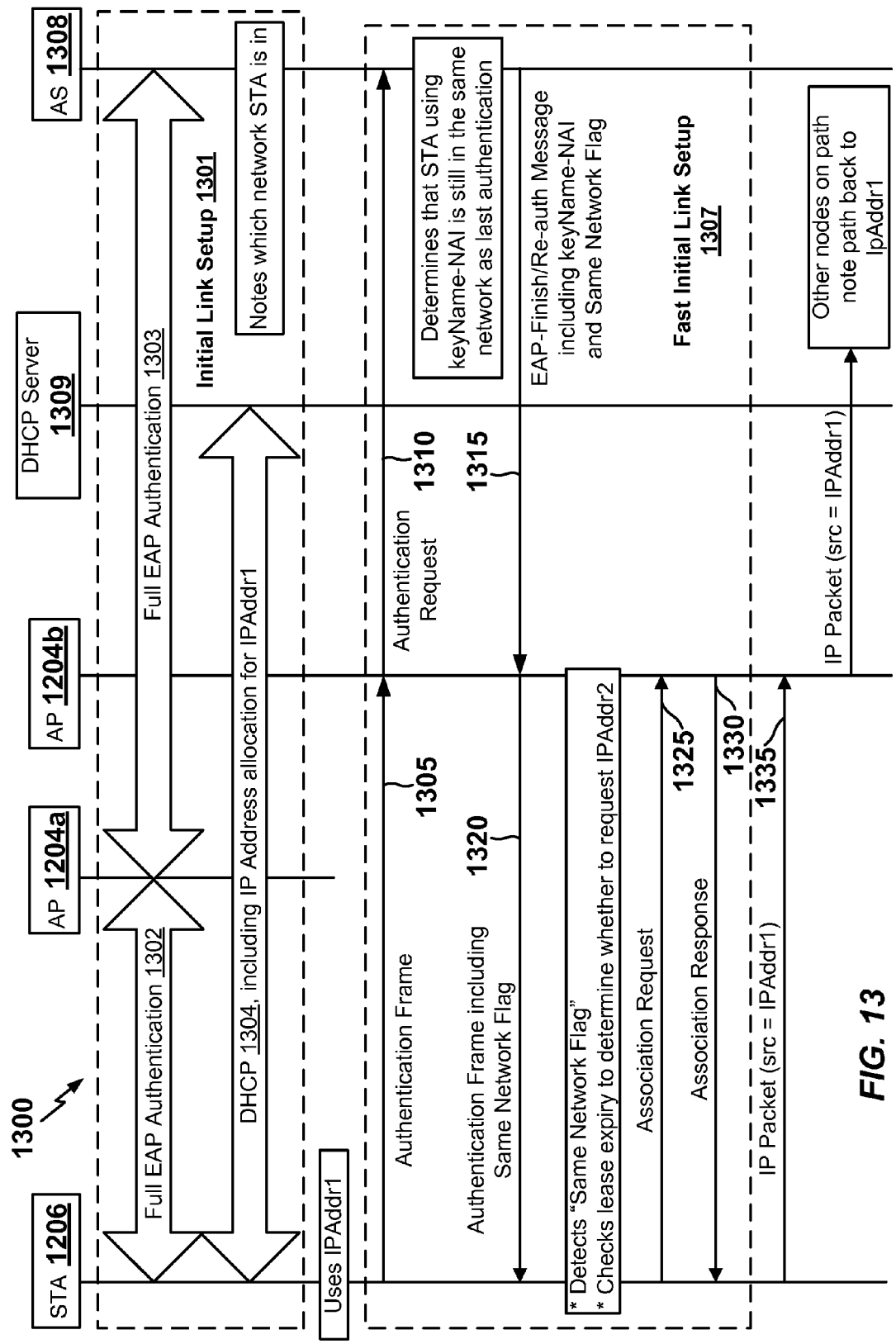
FIG. 13 shows an exemplary communication exchange in the wireless communication system of FIG. 12.

Various embodiments that reduce link setup latency are described herein. Depending on the particular network configuration, latency may be reduced using an Extensible Authentication Protocol re-authentication (ER) server. Alternatively, one or more networks may not include an ER server. An example communication sequence using an ER server is described with reference to FIG. 14. FIG. 13 describes communications that may not utilize an ER server.

FIG. 13 shows an exemplary communication exchange 1300 in a wireless communication system, such as the wireless communication system 1200 of FIG. 12. Signaling is shown between an STA 1206, APs 1204a and 1204b, a DHCP server 1309, and an authentication server 1308 during an authentication and association process. The APs 1204a and 1204b may be included in a common network. For example, the APs may be managed by a common DHCP server, such as the DHCP server 1309.

The communication exchange 1300 depicts an initial link setup 1301 between the STA 1206 and the AP 1204a. The initial link setup 1301 may include EAP communications 1302, 1303 and a DHCP communication 1304. The DHCP communication 1304 may include requesting and obtaining DHCP information, such as an IP address (IPAddr1). During the initial link setup procedure 1301, the authentication server 1308 may identify a network associated with the STA 1206. For example, the authentication server 1308 may store a network address identifier (NAI), such as a keyName-NAI, associated with the STA 1206 in the EAP communication 1303. The authentication server 1308 may store the key-Name-NAI and an association between the STA 1206 and the keyName-NAI.

The communication exchange 1300 further depicts a fast initial link setup 1307 between the STA 1206 and the AP 1204b, such as in response to a user of the STA 1206 moving out of a coverage area associated with the AP 1204a and into a coverage area associated with the AP 1204b. The fast initial link setup 1307 may include an authentication frame 1305 transmitted from the STA 1206 to the AP 1204b and an authentication request 1310 transmitted from the AP 1204b to the authentication server 1308. The authentication frame 1305, the authentication request 1310, and/or one or more other messages of the communication exchange 1300 may comply with a remote authentication dial in user service (RADIUS) protocol and/or a Diameter authentication, authorization, and accounting protocol.

Upon receiving the authentication request 1310, the authentication server 1308 may determine that the STA 1206 is using the same keyName-NAI as in the previous authentication. The authentication server 1308 may transmit an EAP-Finish/Re-Auth message 1315 to the AP 1204b. The EAP-Finish/Re-Auth message 1315 may include a "same network" flag. The same network flag may indicate that the AP 1204b can provide IP communication without re-configuring DHCP information. The same network flag may correspond to the indication 1209. Upon receiving the EAP-Finish/Re-Auth message 1315, the AP 1204b may transmit an authentication frame 1320 to the station. The authentication frame 1320 also includes the same network flag.

Upon receiving the authentication frame 1320 with the same network flag indicated, the STA 1206 may detect the same network flag and may check one or more parameters to determine whether another IP address (IPAddr2) is to be requested irrespective of the same network flag. For example, the STA 1206 may check an expiry of a "lease" associated with IPAddr1 to determine whether IPAddr2 should be requested (e.g., if the lease associated with IPAddr1 will expire within a threshold time duration). If the STA 1206 determines to continue using IPAddr1, the STA 1206 transmits an association request 1325 to the AP 1204b. However, unlike certain conventional techniques, the association request does not include an indication that a DHCP request should be performed for the STA 1206 by the AP 1204b. The AP 1204b then transmits an association response 1330 to the STA 1206.

After receiving the association response 1330, the STA 1206 initiates IP communication using the IP address it previously used during the initial link setup 1301. This is shown by transmission of IP packet 1335 by the STA 1206 using IPAddr1, which the STA 1206 may receive during the initial link setup 1301. The IP packet 1335 includes a source field (src) indicating IPAddr1.

FIG. 13 further illustrates that the AP 1204a may receive the IP packet 1335 and may forward the IP packet 1335 to a destination device indicated by a destination address included in a destination field of the IP packet 1335. The AP 1204a may perform one or more other operations, such as mapping IPAddr1 to a medium access control (MAC) address associated with the STA 1206. One or more other nodes (e.g., servers, routers, hubs, etc.) on a path from the STA 1206 to the destination device may note the path (e.g., by caching addresses) to enable IP communications between the STA 1206 and the destination device.

The example of FIG. 13 illustrates that the STA 1206 can reuse IPAddr1 based on the same network flag received in the authentication frame 1320. The same network flag indicates that the AP 1204b utilizes the same IP network or IP subnetwork for communication as the STA 1206 used for a previous authentication (e.g., with AP 1204a). By reusing the IP address originally obtained during the initial link setup 1301, the need to perform a DHCP request during the fast initial link setup 1307 may be eliminated, thus reducing latency associated with association with the AP 1204b. This reduces the overall elapsed time for the STA 1206 to establish IP communications via AP 1204b.

The example of FIG. 13 illustrates that an authentication server (e.g., the authentication server 1308) may perform operations to reduce latency in link setup. Alternatively or in addition, an ER server may reduce latency in link setup, as described further with reference to FIG. 14.

Figure 14:
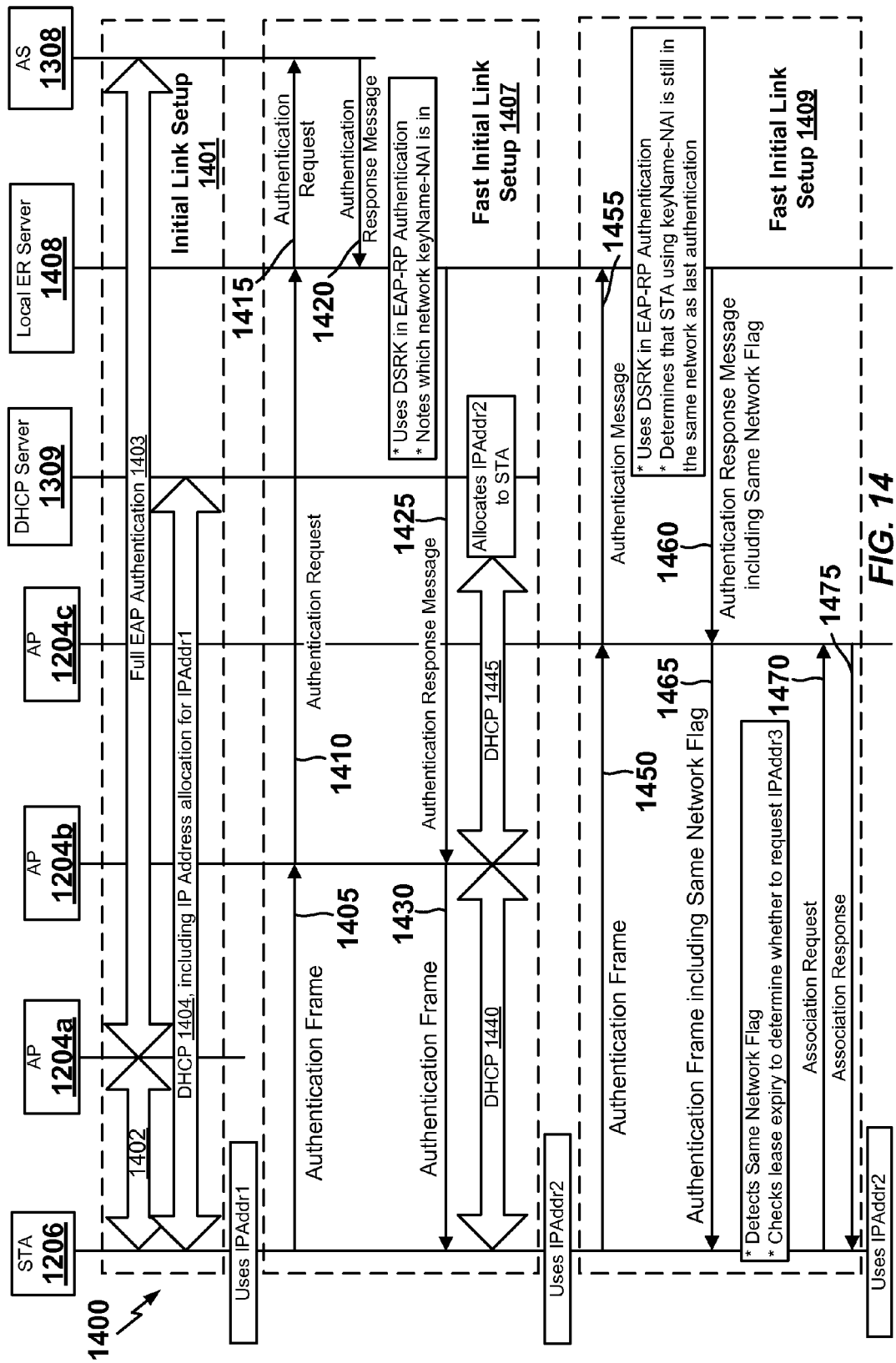
FIG. 14 shows another exemplary communication exchange in the wireless communication system of FIG. 12.

FIG. 14 shows another exemplary communication exchange 1400 in the wireless communication system 1200 of FIG. 12. Communication is shown between an STA 1206, APs 1204a, 1204b, and 1204c, the DHCP server 1309, and the authentication server 1308. FIG. 14 also illustrates communication with a local Extensible Authentication Protocol re-authentication (ER) server 1408.

The communication exchange 1400 depicts an initial link setup 1401 between the STA 1206 and the AP 1204a. The initial link setup 1401 may include EAP communications 1402, 1403 and a DHCP communication 1404. The DHCP communication 1404 may include requesting and obtaining DHCP information, such as an IP address (IPAddr1).

The communication exchange 1400 further depicts a fast initial link setup 1407 between the STA 1206 and the AP 1204b, such as in response to a user of the STA 1206 moving out of a coverage area associated with the AP 1204a and into a coverage area associated with the AP 1204b. The fast initial link setup 1407 may include an authentication frame 1405 transmitted from the STA 1206 to the AP 1204b, and an authentication request 1410 transmitted from the AP 1204b to the local ER server 1408. An authentication request 1415 is then transmitted from the local ER server 1408 to the authentication server 1308. The authentication frame 1405, the authentication requests 1410 and 1415, and/or one or more other messages of the communication exchange 1400 may comply with a remote authentication dial in user service (RADIUS) protocol and/or a Diameter authentication, authorization, and accounting protocol. One or more messages of the communication exchange 1400 may indicate a domain name associated with IP communications.

Upon receiving the authentication request 1415, the authentication server 1308 transmits an authentication response message 1420 to the local ER server 1408. In the example of FIG. 14, the local ER server 1408 records an association between the IP network used by the AP 1204b to communicate with the local ER server 1408 and the key-Name-NAI of the STA 1206 (e.g., based on the authentication response message 1420). The local ER server 1408 may perform one or more Extensible Authentication Protocol Re-authentication Protocol (EAP-RP) procedures, such as using a domain-specific root key (DSRK). The local ER server 1408 then transmits an authentication response message 1425 to the AP 1204b.

Upon receiving the authentication response message 1425, the AP 1204b transmits an authentication frame 1430 to the STA 1206. The authentication frame 430 indicates that authentication is complete. The fast initial link setup 1407 may further include DHCP reconfiguration operations 1440, 1445 in order to obtain a second IP address (IPAddr2). In this example, the DHCP server 1309 assigns IPAddr2 to the STA 1206. The STA 1206 then uses IPAddr2 for IP communication (e.g., to download content or to send an email, as illustrative examples).

The communication exchange 1400 further depicts a fast initial link setup 1409 between the STA 1206 and the AP 1204c, such as in response to a user of the STA 1206 moving out of a coverage area associated with the AP 1204b and into a coverage area associated with the AP 1204c. The fast initial link setup 1409 may include transmitting an authentication frame 1450 to the AP 1204c by the STA 1206. In response to the authentication frame 1450, the AP 1204c transmits an authentication message 1455 to the local ER server 1408.

Upon receiving the authentication message 1455, the local ER server 1408 determines that the STA 1206 is still in the same network as during the fast initial link setup 1407 (e.g., based on a determination that the STA 1206 is using the keyName-NAI). The local ER server 1408 may perform one or more EAP-RP procedures, such as using a DSRK.

The local ER sever 1408 may transmit an authentication response message 1460. In some aspects, the authentication response message 1460 may be an EAP-Finish/Re-Auth message. The authentication response message 1460 includes an indication that the keyName-NAI is still in the same network as during a previous authentication (e.g., a "same network" flag). The same network flag may correspond to the indication 1209. Upon receiving the authentication response message 1460, the AP 1204c transmits an authentication frame 1465 to the STA 1206. Because the authentication response message 1460 includes the same network flag, the authentication frame 1465 also includes the same network flag.

The STA 1206 may receive the authentication frame 1465. The STA 1206 may detect the same network flag and may check one or more parameters to determine whether another IP address (IPAddr3) is to be requested irrespective of the same network flag. For example, the STA 1206 may check an expiry of a "lease" associated with IPAddr2 to determine whether IPAddr3 should be requested (e.g., if the lease associated with IPAddr2 will expire within a threshold time duration). If the STA 1206 determines to continue using IPAddr2, the STA 1206 transmits an association request 1470 to the AP 1204c.

In the example of FIG. 14, the association request 1470 does not include an indication of a DHCP request, since the STA 1206 is to reuse the IPAddr2 used for IP communications via AP 1204c, based at least in part on the same network flag received in the authentication frame 1465. The example of FIG. 14 shows that no DHCP is performed by the AP 1204c in response to receiving the association request. The AP 1204c then transmits an association response 1475 back to the STA 1206.

Because no DHCP messages are received or transmitted by the AP 1204c during association with the STA 1206, the latency between the association request message 1470 and the association response message 1475 is reduced. For example, the latency is reduced as compared to a system that provides DHCP information to a mobile device in response to each association process initiated by the mobile device.

Figure 15:
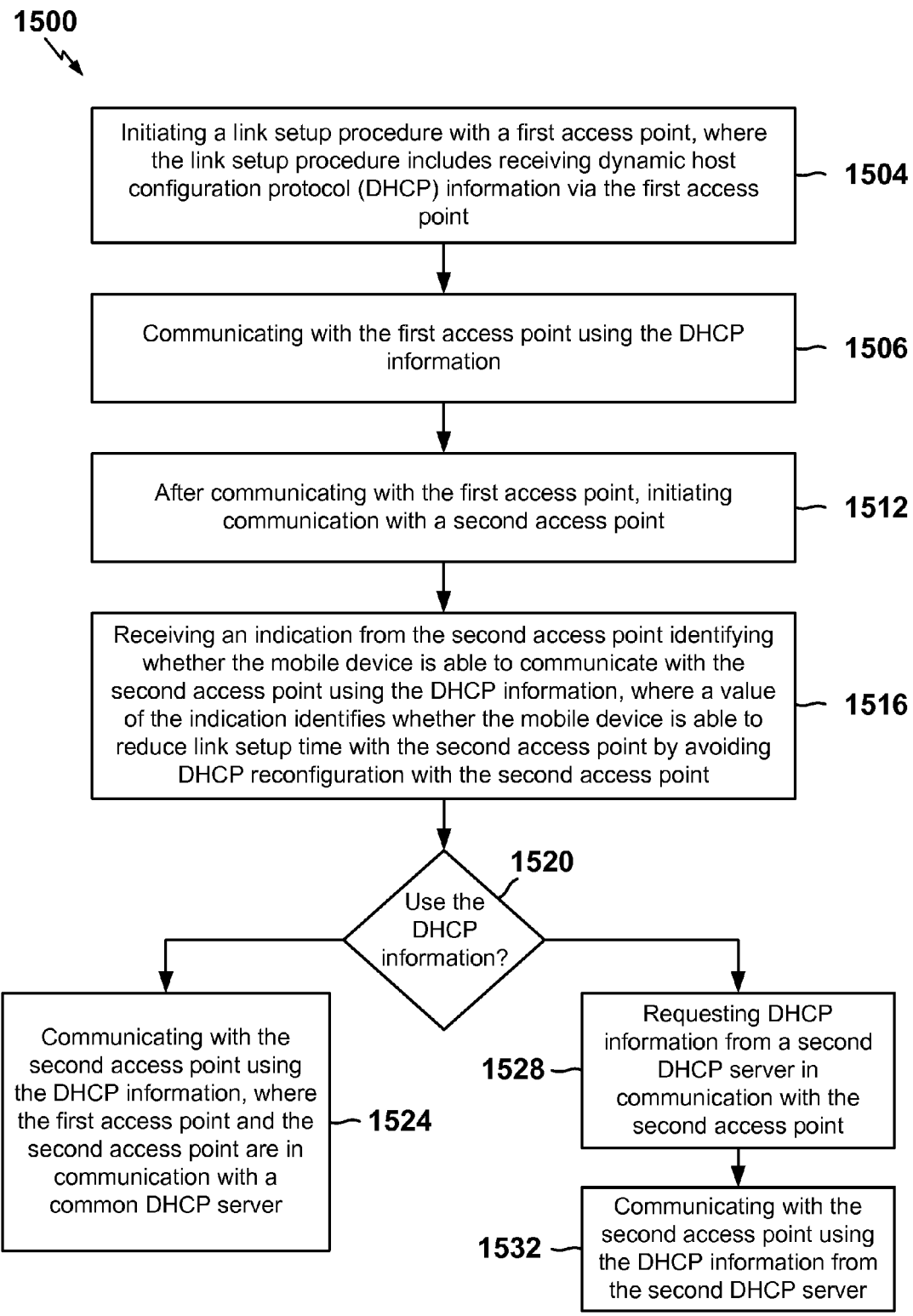
FIG. 15 is a flowchart to illustrate an example method of operation that may be performed by a mobile device operating within the wireless communication system of FIG. 12.

Referring to FIG. 15, a particular illustrative embodiment of a method of operating a mobile device is depicted and generally designated 1500. The method 1500 may be performed by any of the STAs 1206 of FIG. 12.

The method 1500 includes initiating a link setup procedure, at 1504. The link setup procedure may correspond to a FILS procedure, as an illustrative example. The link setup procedure includes receiving DHCP information via the first access point. The DHCP information may be received from a DHCP server, such as the DHCP server 1210a of FIG. 12.

The DHCP information may include an IP address associated with the mobile device. The IP address corresponds to an IP network. In some aspects, a network portion of the IP address may identify the IP network. In some aspects, the IP network may be an IP subnet or sub-network. If the IP address corresponds to an IP subnet, the IP subnet may be part of a single physical subnet or it may be distributed over multiple physical subnets. In some aspects, the IP address is received in an authentication frame, for example, in an association response and/or an association response.

The method 1500 further includes communicating with the first access point using the DHCP information, at 1506. The first access point may correspond to the AP 1204a of FIG. 12. Communicating with the first access point using the DHCP information may include receiving data that is addressed to the mobile device via the IP address. As a particular non-limiting example, the mobile device may receive data (e.g., videos, images, email, etc.) from a server via the first access point based on the IP address. Alternatively or in addition, communicating with the first access point may include sending data to a destination (e.g., a server) via the first access point using the IP address.

In some aspects, the IP address may be used as a source IP address when communicating with the first access point. In some aspects, communicating with the first access point does not include exchange of IP level communications with the first access point. Instead, in some aspects, the IP communications may be encapsulated within some other protocol packet. The first access point may then de-encapsulate the IP packets and transmit them over the IP network on behalf of the mobile device, as an illustrative example.

The method 1500 may further include initiating communication with a second access point after communicating with the first access point, at 1512. The second access point may correspond to the AP 1204b of FIG. 12. The mobile device may initiate communication with the second access point in response to moving out of range of the first access point and into range of the second access point. For example, the mobile device may detect one or more communications from the second access point in response to moving to a location within range of the second access point, such as within a range of receiving a "beacon" or other signal, which may comply with a communication standard, such as an Institute of Electrical and Electronics Engineers (IEEE) 802.11 communication standard.

In response to detecting the beacon or other signal, the mobile device may initiate an authentication procedure with the second access point, as an illustrative example. In some aspects, the authentication procedure may include transmitting an EAP-Init/Re-auth message. The EAP-Init/Re-Auth message may indicate a keyName-NAI identifying the mobile device and/or a network used by the mobile device.

The method 1500 may further include receiving an indication (e.g., a same network flag) from the second access point identifying whether the mobile device is able to communicate with the second access point using the DHCP information, at 1516. The indication may correspond to the indication 1209. A value of the indication identifies whether the mobile device is able to reduce link setup time with the second access point by avoiding DHCP reconfiguration with the second access point. To illustrate, the indication may specify that the first access point and the second access point are included in a common network, such as a common network that includes a common DHCP server, where the first access point and the second access point are in communication with (e.g., managed by) the common DHCP server. In this case, the indication may have a first value, such as a "0" value, as an illustrative example. Alternatively, the indication may specify that the first access point and the second access point are managed by different DHCP servers. In this example, the indication may have a second value, such as a "1" value, as an illustrative example.

The indication may identify whether the second access point can provide IP communication for the mobile device over an IP network previously used by the mobile device. In some aspects, the IP network is an IP sub-network. In some aspects, the IP address used with the first access point indicates an IP network previously used by the mobile device. In some aspects, the indication is received in an extensible authentication protocol (EAP) message. In some aspects, the indication is received as part of an EAP-Finish/Re-Auth message. The indication may be provided by a type/value attribute, such as an Extensible Authentication Protocol Re-authentication Protocol (EAP-RP) attribute. For example, the presence or absence of an EAP-RP attribute may provide the indication. In some other aspects, a different EAP message may provide the indication.

The method 1500 may further include determining, based on the indication, whether to use the DHCP information to communicate with the second access point, at 1520. As an illustrative example, a first value of the indication may specify that the mobile device may use the DHCP information in communications with the second access point, and a second value of the indication may specify that the mobile device is to obtain second DHCP information for communications with the second access point.

If the mobile device is to use the DHCP information, the method 1500 may further include communicating with the second access point using the DHCP information, where the first access point and the second access point are in communication with a common DHCP server, at 1524. The common DHCP server may correspond to the DHCP server 1210a of FIG. 12, as an illustrative example.

If the mobile device is to obtain DHCP information from a second DHCP server for communications with the second access point, the method 1500 may further include requesting the DHCP information from the second DHCP server, at 1528. The second DHCP server may correspond to the DHCP server 1210b of FIG. 12, as an illustrative example. In certain implementations, instead of the mobile device sending a DHCP request message, the mobile device may send a message, such as a message within an association request, to the second access point. The message may request the second access point to initiate a DHCP request on behalf of the mobile device. In some other aspects, the mobile device may exchange messages directly with a DHCP server. In this case, the mobile device may determine whether to transmit a DHCP request message to the DHCP server based on the indication.

The method 1500 may further include communicating with the second access point using the second DHCP information, at 1532. For example, the second DHCP information may include a second IP address, and data may be sent to and/or received from a server via the second access point using the second IP address.

The method 1500 of FIG. 15 enables fast link setup operations. For example, the method 1500 may avoid DHCP reconfiguration when a current or "existing" DHCP credential (e.g., an IP address) may suffice. By reducing or eliminating communications with a DHCP server in this case, link setup time is reduced.

The method 1500 may optionally include determining whether to perform IP communication with the second access point using the IP address based further on one or more parameters. For example, the mobile device may determine the time remaining before the lease of the IP address expires. If the time remaining fails to satisfy a threshold, or if the lease of the IP address has already expired, then the station may determine not to reuse the IP address for IP communications via the second access point (even if the indication identifies that the IP address can be reused by the mobile device in communications with the second access point).

The method 1500 may optionally include storing an association between the IP address and the first access point. The mobile device may access the association to identify the IP address upon receiving the indication via the second access point. For example, in some aspects, upon receiving the indication, the mobile device may determine a most recent access point via which the mobile device performed IP communications (i.e., the first access point in the illustrative example of FIG. 15). After accessing the association, the mobile device may then determine the IP address that can be used for communications with the second access point.

In some aspects, the method 1500 may optionally include receiving a message from the first access point indicating a first domain name. For example, the mobile device may receive an EAP-Finish/Re-Auth packet indicating the domain name. In some aspects, the domain name may be a domain name of a local ER server (e.g., the local ER server 1408 of FIG. 14) used to perform an authentication on behalf of the first access point. These aspects may further include storing an association between the IP address, the first access point, and the first domain name. In these aspects, the method 1500 may further include receiving a second domain name from the second access point. The second domain name may also be received in an EAP-Finish/Re-Auth packet. The second domain name may identify a local ER server used to perform an authentication on behalf of the second access point.

In this example, after receiving the second domain name, the mobile device may search a list of associations, including the association between the IP address, the first access point, and the first domain name. Searching the list may include comparing the second domain name to domain names stored in the list of associations. If the mobile device identifies two domain names that are equal, the mobile device may have an indication that the IP address associated with the domain name equal to the second domain name can be used for IP communications via the second access point. In some cases, this may be the first IP address.

In some aspects, the mobile device may receive an indication of an authentication server (e.g., the authentication server 1308) used to authenticate the mobile device for communications with an access point. The indication of an authentication server may be a host name or IP address of the authentication server in some aspects. For example, this indication may be received in the authentication frame 1320 or 1430. The mobile device may receive multiple indications of multiple authentication servers. For example, the first, second, and third access points may communicate with first, second, and third authentication servers, respectively. Indications of these authentication servers may be received by the mobile device. The mobile device may use the indications to determine whether to utilize a particular IP address when communicating with a particular access point.

For example, the IP address may first be obtained by the mobile device from the first access point, and authentication with the first access point may indicate a first authentication server. In a subsequent authentication with a second access point, the mobile device may receive an indication of a second authentication server, different than the first authentication server. Because the authentication server for the second access point is different than the authentication server for the first access point, the mobile device may obtain a new IP address during association with the second access point instead of reusing the IP address obtained for communication with the first access point. The mobile device may obtain a new IP address even if authentication with the second access point includes an indication that the second access point can provide IP communication using an IP network is provided by the second access point.

Certain devices described with reference to the method 1500 may maintain a list of associations between IP addresses, authentication servers, and also local ER servers. One example list is shown in Table 1:

TABLE 1

| IP Address | IP Lease valid Until | Authentication Server | Local ER Server | Access Point |
|---|---|---|---|---|
| IP1 | Time 1 | A1 | ER1 | AP1 |
| IP2 | Time 2 | A2 | ER2 | AP2 |
| IP3 | Time 3 | A3 | None | AP3 |

In these implementations, a device may receive an indication of an authentication server and possibly a local ER server during an authentication with an access point. When the device receives an indication that the second access point provides IP communications using an IP network previously used by the station, the device may then search its previous associations, as stored in the example of Table 1. The search may identify an IP address that matches the combination of authentication servers and local ER servers indicated during the association with the second access point.

If no entry in the table is found matching the indicated authentication and/or local ER server, the device may not reuse the IP address when performing IP communications with the second access point. Instead, during association with the second access point, the device may request that a new IP address be allocated for it. This may cause the second access point to initiate a DHCP request/reply exchange. Note that the new IP address may be requested even if the indication indicates that IP communication using the IP network can be provided by the second access point. To further illustrate, consider the examples shown in Table 2. The examples assume that all of the IP addresses listed in Table 1 have adequate lease time remaining such that they can be reused if appropriate:

TABLE 2

| Authenticating with | Value of Indication | Indication of Authentication Server | Indication of local ER server | Result |
|---|---|---|---|---|
| AP 4 | Same IP Network | A1 | ER1 | Reuse IP1 |
| AP 5 | Same IP Network | A5 | ER2 | Reuse IP2 |
| AP 6 | Same IP Network | A6 | ER6 | Request New IP address |

TABLE 2-continued

| Authenticating with | Value of Indication | Indication of Authentication Server | Indication of local ER server | Result |
|---|---|---|---|---|
| AP 7 | Same IP Network | A3 | None | Reuse IP3 from AP6 |
| AP 8 | Same IP Network | A3 | ER8 | Request New IP Address from AP8 |

To illustrate using the examples of Table 2, in the first example, a device performing the method 1500 may authenticate with AP 4. As part of the authentication process with AP4, the device receives an indication that the authentication server is A1 and the local ER server is ER1. The device also receives an indication that IP communication using a previously used IP network is provided by the second access point. The device can search a table, such as a table corresponding to Table 1, to identify an entry matching authentication server=A1 and local ER server=ER 1, which shows an IP address of "IP1." If the lease for IP1 is not already expired and will not expire soon, the device may reuse IP1 for IP communications via AP4.

In the example above for AP5, the device searches the table for an authentications server=A5 and local ER server=ER2, and finds an entry providing IP2. Because the same IP network flag is set, IP2 can be reused for IP communications via AP5.

In the example above for AP6, the device searches Table 1 for authentication server=A6 and local ER server=ER6. No entry is found. Therefore, despite the indication identifying the same IP network, the device requests a new IP address from AP6 before performing IP communications via AP6.

In the example above for AP7, the device searches Table 1 for an entry where the authentication server is A3. Note that since no local ER server indication is received when performing authorization with AP7, only the authentication server A3 is searched. As entry identifying IP3 is found with an authentication server A3 in Table 1, and therefore IP3 may be reused for IP communication with AP7, since the authentication with AP7 included an indication that IP communication using the IP network is provided by the seventh access point (AP7).

In the example above for AP8, the device searches Table 1 for an entry with an authentication server of A3 and a local ER server of ER8. None is found, so the device requests a new IP address to use when performing IP communication via AP8. The above are only examples of how a device may utilize associations between access points, authentication servers, and/or local ER servers, and/or IP addresses, in combination with an indication received as part of an authentication process with an access point to potentially reuse an IP address previously used for communication via another access point. By reusing IP addresses when possible, a device may reduce the latency associated with establishing IP communication via an access point.

In certain cases, a mobile device (or STA) may not receive a response that is transmitted by a server or access point. For example, to complete an authentication procedure, an authentication server or local ER server may transmit an EAP-Finish or an EAP-Finish/Re-Auth message to the STA, such as via the AP2. However, in some cases, the STA may not receive this message. This can occur for a variety of reasons, for example:

I. The AS/local ER Server never received the EAP or EAP-RP Packet from the STA because of network communication issues.

II. The AS/local ER Server received the EAP or EAP-RP Packet, but authentication failed or the AS/local ER Server decided not to authorize the STA for AP2, so authentication is considered unsuccessful. However, the STA did not receive the EAP-Finish or EAP-Finish/Re-auth Packet from the AS/local ER Server because of communication issues. The communications issues may be between the AS/local ER Server and the AP or between the AP and STA).

III. The AS/local Server received the EAP or EAP-RP Packet, and decided to authorize the STA to use AP2. This authentication is considered successful. However, the STA did not receive the EAP-Finish or EAP-Finish/Re-auth Packet from the AS/local ER Server because of communication issues In the examples above, the STA is generally not able to determine which of the example situations occurred (I, II or III). The STA then attempts a second authentication to connect to an AP3 using EAP-RP, noting that AP3 could be in Network 1, Network 2 or yet another Network (Network 3).

The correct behavior of the STA is as follows:
a. If AP3 is in Network 1 then the STA can re-uses the DHCP-configured information, reducing the need for an additional DHCP operation when associating with AP3. While the station could request a new IP address when associating with AP3, this will result in additional latency during the association, which is disfavored if it can be avoided safety.
b. If AP3 is in Network 2 or Network 3, then the STA cannot reuse the DHCP configured information for Network 1. Therefore, the STA should request a new IP address from AP3.

Next, we consider a repeated authentication attempt under the following three conditions. First, the AS/local Server is unaware of the first authentication attempt. At the second authentication attempt, the AS/local Server will note that the STA was in Network 1 at the most recent successful authentication. We examine the cases based on the network containing AP3:
a. AP3 is in Network 1: the AS/local ER Server returns a same network flag. If the STA uses this flag, then this results in preferred behavior of the STA.
b. AP3 is in Network 2: the AS/local ER Server does not return a same network flag. If the STA uses this flag, then this results in preferred behavior of the STA.
c. AP3 is in Network 3: the AS/local ER Server does not return a same network flag. If the STA uses this flag, then this results in preferred behavior of the STA.

Second, the AS/local Server is aware of the first authentication attempt, and considers that authentication attempt to be unsuccessful. At the second authentication attempt, the AS/local Server will note that the STA was in Network 1 at the most recent successful authentication. We examine the cases based on the network containing AP3:
a. AP3 is in Network 1: the AS/local ER Server returns a same network flag. If the STA uses this flag, then this results in acceptable (but not preferred) behavior of the STA.
b. AP3 is in Network 2: the AS/local ER Server does not return a same network flag. If the STA uses this flag, then this results in preferred behavior of the STA.
c. AP3 is in Network 3: the AS/local ER Server does not return a same network flag. If the STA uses this flag, then this results in preferred behavior of the STA.

Third, the AS/local Server is aware of the first authentication attempt, and considers that authentication attempt to be successful. At the second authentication attempt, the AS/local Server will note that the STA was in Network 2 at the most recent successful authentication. We examine the cases based on the network containing AP3:
a. AP3 is in Network 1: the AS/local ER Server does not return a same network flag. If the STA uses this flag, then this results in acceptable (but not preferred) behavior of the STA.
b. AP3 is in Network 2: the AS/local ER Server returns a same network flag. If the STA uses this flag, then this results in unacceptable behavior of the STA.
c. AP3 is in Network 3: the AS/local ER Server does not return a same network flag. If the STA uses this flag, then this results in preferred behavior of the STA.

If the STA treats the replies as correct, then the first case results in the preferred behavior, the second scenario always results in at least acceptable behavior (although not always preferred), and third case can result in unacceptable behavior.

Since the STA does not know which of the situations described above occurred, and some result in unacceptable reuse of an IP address by the STA, the STA may ignore a same network indication from an AS/local ER Server (via an access point) if it did not receive the EAP-Finish or EAP-Finish/Re-auth at the end of the STA's most recent EAP or EAP-RP authentication with that AS/local ER Server.

To further illustrate, referring again to FIG. 15, the method 1500 may optionally include communicating with one more additional access points. For example, if an authentication response is not received from the second access point (e.g., during link setup with the second access point), the STA 1206*a* may initiate communication with a third access point, which may correspond to the AP 1204*c* of FIG. 14.

Communicating with the third access point may include transmitting an EAP-Init/Re-auth message. The EAP-Init/Re-Auth message may indicate a keyName-NAI identifying the mobile device and/or a network used by the mobile device. An indication (e.g., the indication 1209) may be received from the third access point by the mobile device. The indication may specify whether the third access point can provide IP communication over an IP network or IP sub-network previously used by the mobile device. In some aspects, the indication is received in an EAP message. In some aspects, the indication is received as part of an EAP-Finish/Re-Auth message. The indication may be provided by a type/value attribute, such as an EAP-RP attribute. For example, the presence or absence of an EAP-RP attribute may provide the indication. In some other aspects, a different EAP message may provide the indication.

The method 1500 may optionally include requesting a second IP address for IP communication with the third access point based on whether an authentication response was received from the second access point and further based on the indication. For example, if the indication specifies that IP communication with the third access point is to be performed over the IP network (or sub-network), then the mobile device may avoid requesting a new IP address (for use with the third access point) if a response to the authentication request with the second access point has been received. However, if no response was received to the authentication request from the second access point, a new IP address may be requested by the mobile device (regardless of the indication). This may prevent inappropriate reuse of an IP address due to a mismatched state between the mobile device and an access point.

Figure 16:
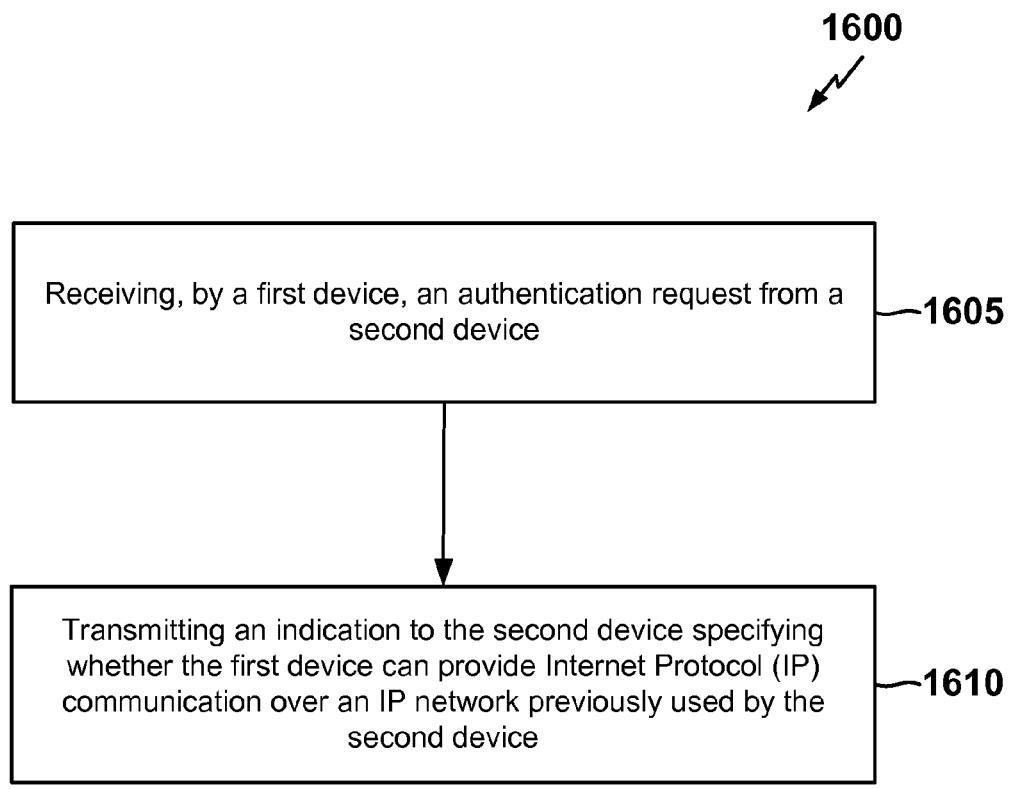
FIG. 16 is a flowchart to illustrate an example method of operation that may be performed by an access point operating within the wireless communication system of FIG. 12.

FIG. 16 is a flowchart of a method 1600 for reducing for reducing latency when establishing IP communication over a communications network. In some aspects, the communications network is the wireless communication system 1200 of FIG. 12. In an embodiment, the method 1600 may be performed by an access point, such as any of the APs 1204*a-c*. In some aspects, the method 1600 may be performed by an access point to enable a station to reuse an IP address for IP communications with the access point that had previously been allocated and used for IP communication with a different access point. The method 1600 may facilitate reduced latency associated with establishing an association with the station, enabling the station to establish IP communication through the access point more efficiently and quickly as compared to a conventional technique.

An authentication request is received by a first device for a second device (e.g., is received directly from the second device, or is received indirectly from the second device, such as from an "intermediary device" on behalf of the second device), at 1605. In some aspects, the first device is an access point (e.g., any of the APs 1204*a-c*) and the second device is a station (e.g., any of the STAs 1206*a-d*). In some aspects, the second device is a relay. In some aspects, the authentication request is received from the second device directly, for example, when the method 1600 is performed by an access point.

In some aspects, an authentication request may be transmitted to a third device in response to receiving the authentication request for the second device. In some aspects, the third device is an EAP server or a local ER server. For example, an access point performing the method 1600 may receive an authentication request from a station, and may generate an authentication request to an authorization server and/or a local ER server in response to receiving the request from the station. In some aspects, the method 1600 may further include receiving an authentication response from the authorization server or the local ER server. The response may include an indication of whether the device can provide Internet Protocol communication over an IP network previously used by the second device. This indication may then be "passed through" the device performing the method 1600.

An indication is transmitted to the second device specifying whether the first device can provide IP communication over an IP network previously used by the second device, at 1610. In some aspects, the indication identifies whether the first device can provide IP communication over an IP subnetwork previously used by the second device. In some aspects, the indication is received by the second device in an EAP-Finish/Re-Auth packet sent by the first device. In some aspects, an indication of an authentication server used to perform the authentication may also be transmitted by the first device to the second device. In some aspects, an indication of a local ER server may be transmitted by the first device to the second device.

Figure 17:
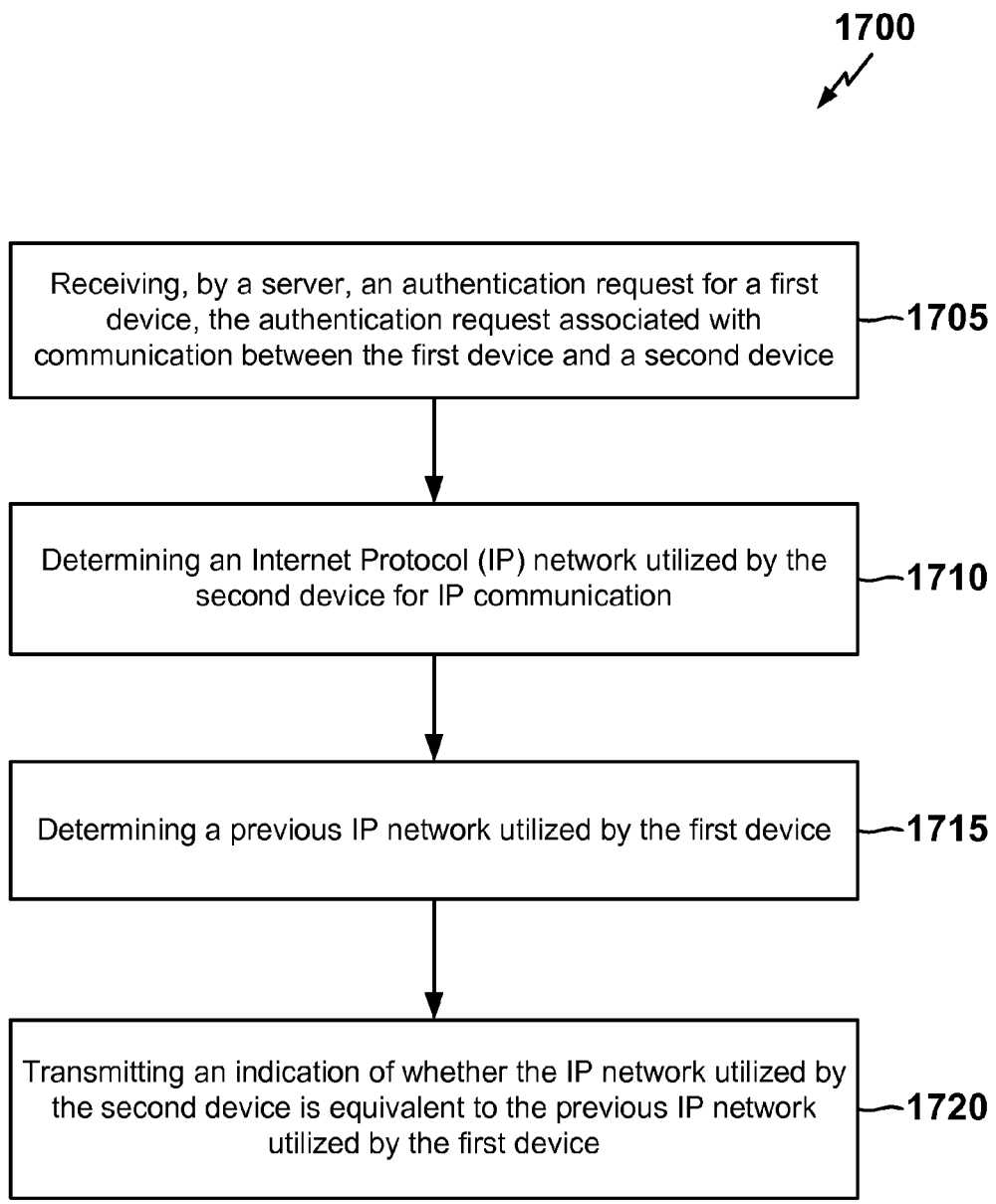
FIG. 17 is a flowchart to illustrate an example method of operation that may be performed by a server operating within the wireless communication system of FIG. 12.

FIG. 17 is a flowchart of a method 1700 for reducing latency when establishing IP communication over a communications network. In some aspects, the communications network is the wireless communication system 1200 of FIG. 12. In various implementations, the method 1700 may be performed by a server (e.g., the server 1212), by an authentication server (e.g., the authentication server 1308), and/or by an EAP server, such as a local ER server (e.g., the local ER server 1408). In some aspects, the method 1700 may enable a station to reuse an IP address that had previously been allocated and used for IP communication with a different access point. The method 1700 may facilitate reduced latency of an association procedure between the station and the access point, enabling the station to establish IP communication through the access point more efficiently and quickly as compared to a conventional technique.

The method 1700 may include receiving an authentication request by a server, at 1705. In some aspects, the server is an authentication server. In some aspects the server is a local ER server. In some aspects, the server is an EAP server. The authentication request is for a first device (e.g., a mobile device, such as any of the STAs 1206*a-d*). The authentication request is associated with communication between the first device and a second device (e.g., an access point, such as any of the APs 1204*a-c*). In some aspects, the authentication request is based on a second authentication request received by the second device from the first device. For example, a server (such as the authentication server 1308 or the local ER server 1408) may receive an authentication request from an access point (either directly or indirectly, such as via one or more of a gateway, firewall, router, or other network device).

In some aspects, the authentication request may be an EAP authentication, such as an EAP-Init/Re-Auth message. The authentication request may include a keyName-NAI corresponding to or identifying the first device. The access point generating the authentication request may receive a corresponding authentication request from the first device, which may correspond to any of the authentication frames 1305, 1405.

The method 1700 may further include determining an IP network utilized by the second device for IP communication, at 1710. For example, an authentication server may determine an IP network used by the access point generating the authentication request, such as by identifying a source IP address included in the authentication request received at 1705. Alternatively, the access point may indicate the IP network of the access point explicitly in an EAP or other message to the server. Alternatively, the server may have access to a network configuration database that enables it to determine the IP network used by the access point for IP communication.

The method 1700 may further include determining a previous IP network utilized by the first device, at 1715. In some aspects, the server may store an association between devices requesting authentication and an IP network used by the devices for IP communication. As authentication requests from devices are received, a database of associations is accumulated. In some aspects, the database may correspond to the example shown in Table 3:

TABLE 3

| Keyname-NAI | IP Network |
|---|---|
| KEY1 | IP1 |
| KEY2 | IP2 |
| KEY3 | IP3 |

In some aspects, entries in a database corresponding to the example of Table 3 may be "aged out" (e.g., evicted) based on one or more techniques known in the art. When an authentication request for a device is received, the authentication request may include a keyName-NAI field identifying the first device. In some aspects, the database example represented by Table 3 may be searched to determine whether previous authentications for the device have been performed, and if so, with which IP networks those authentications were associated with.

The method 1700 may further include transmitting an indication of whether the IP network utilized by the second device is equivalent to the previous IP network utilized by the first device, at 1720. In some aspects, the indication is transmitted as part of an EAP-Init/Re-Auth message.

In some aspects, no previous IP network for the first device may be identified. For example, in the example of Table 3 above, there may be no entry for a keyName-NAI included in the authentication message. In this case, the transmitted indication may indicate that the IP network utilized by the second device is not equivalent to "the previous IP network" (even if there is no previous IP network) utilized by the first device. Alternatively, a search of a database may identify an entry for the keyName-NAI included in the authentication request, but the IP network indication associated with that keyName-NAI may be different than the IP network determined at 1710. In this case, the transmitted indication may also indicate the IP network utilized by the second device is not equivalent to the previous IP network utilized by the first device.

In some aspects, both of the above examples may result in transmission of a message including no explicit indication relating to the previous IP network of the first device. For example, in some implementations, if the previous IP network of the first device is not equivalent to the IP network utilized by device, no explicit indication is transmitted, at 1720. In these implementations, an explicit indication is only transmitted when the previous IP network of the first device is equivalent to the IP network utilized by the second device. For example, some implementations add an EAP-RP attribute to an EAP-Finish message when the previous IP network is equivalent to the IP network utilized by the second device.

Other implementations may use different EAP-RP attributes to indicate each condition. Some other implementations may use an EAP-RP attribute that can have a variety of different values to indicate the various conditions described above.

Figure 18:
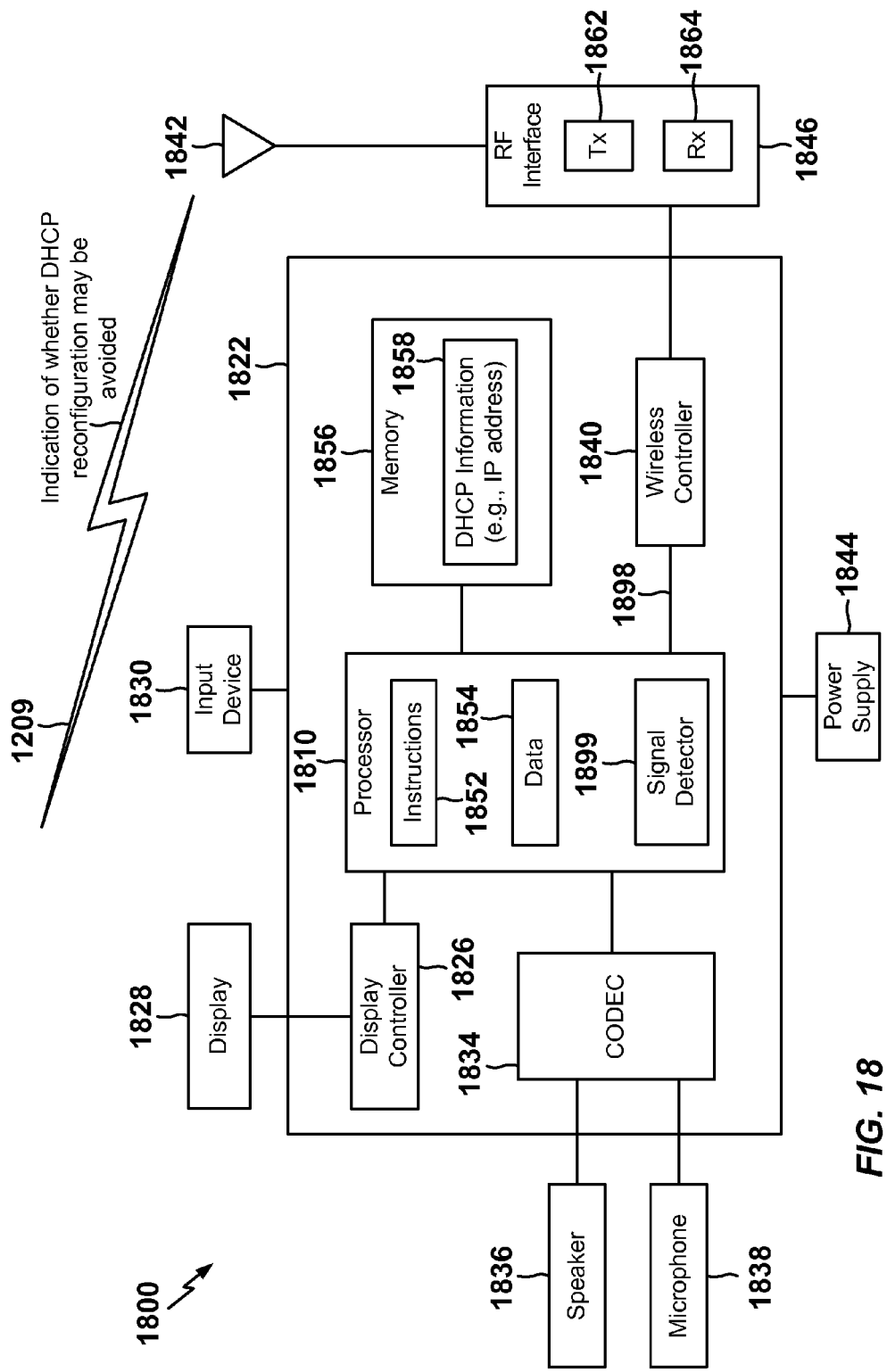
FIG. 18 is a block diagram of a mobile device that may operate within the wireless communication system of FIG. 12.

Referring to FIG. 18, a particular illustrative embodiment of a mobile device is depicted and generally designated 1800. The mobile device 1800 may correspond to one or more of the STAs 1206*a-d* of FIG. 12.

The mobile device 1800 includes a processor 1810. The processor 1810 may be coupled to a memory 1856. The processor 1810 may execute instructions 1852 use data 1854. The processor 1810 may include one or more processor units configured to control operation of the mobile device 1800. One or more of the processor units can be collectively referred to as a central processing unit (CPU). The processor 1810 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor 1810 includes a DSP, the DSP can be configured to generate a packet (e.g., a data packet) for transmission. In some aspects, the packet can include a physical layer data unit (PPDU).

The mobile device 1800 can also include a memory 1856. The memory 1856 may include a read-only memory (ROM), random access memory (RAM), or a combination thereof. A portion of the memory 1856 can also include non-volatile random access memory (NVRAM). The processor 1810 can be configured to perform logical and arithmetic operations based on program instructions stored within the memory 1856. The processor 1810 can be configured to implement one or more methods described herein, for example in conjunction with executable instructions accessed from the memory 1856.

FIG. 18 also shows a display controller 1826 that is coupled to the processor 1810 and to a display 1828. A coder/decoder (CODEC) 1834 can also be coupled to the processor 1810. A speaker 1836 and a microphone 1838 can be coupled to the CODEC 1834. The mobile device 1800 may further include an input device 1830 and a power supply 1844. The mobile device 1800 may include a housing 1822 that includes one or more components of the mobile device 1800. One or more components of the mobile device 1800 can be coupled together by one or more buses (or a bus system), which may include a representative bus 1898. The bus system can include a data bus, a power bus, a control signal bus, and/or a status signal bus, as illustrative examples. Those of skill in the art will appreciate the components of the mobile device 1800 can be coupled together or accept or provide inputs to each other using one or more other structures.

FIG. 18 further indicates that a wireless controller 1840 can be coupled to the processor 1810. The wireless controller 1840 may be further coupled to an antenna 1842 via a radio frequency (RF) interface 1846 (e.g., a transceiver). The RF interface 1846 may include a transmitter (Tx) 1862 and a receiver (Rx) 1864. The mobile device 1800 can also include multiple transmitters, multiple receivers, multiple transceivers, and/or multiple antennas (not shown in FIG. 18).

In a particular embodiment, the processor 1810 includes a signal detector 1899. The signal detector 1899 can be used to detect signals received by the RF interface 1846. The signal detector 1899 may detect or measure one or more signal parameters such as total energy, energy per subcarrier per symbol, power spectral density, and/or one or more other parameters.

In operation, the mobile device 1800 may communicate with a first access point, such as the AP 1204*a*. For example, the mobile device 1800 may request and/or receive network configuration information, such as DHCP information 1858. The mobile device 1800 may receive the DHCP information 1858 from a DHCP server, such as the DHCP server 1210*a*. The DHCP information 1858 may indicate an IP address associated with the mobile device 1800. The mobile device may use the IP address for Internet communications, such as to send data to and to receive data from one or more servers. The IP address may be valid for a particular time duration (e.g., the IP address may be associated with a "lease" that is valid for the time duration). At the end of the time duration, the mobile device 1800 may request another IP address (e.g., by sending a request to the DHCP server 1210*a* via the AP 1204*a*).

After communicating with the first access point, the mobile device 1800 may initiate communication with a second access point. For example, if a user of the mobile device 1800 moves out of a service area associated with the first access point, the mobile device 1800 may initiate communication (e.g., may perform link setup) with the second access point. During link setup, the mobile device 1800 may receive the indication 1209. The indication 1209 may be received from the second access point and may indicate whether the mobile device 1800 may communicate with the second access point using current DHCP information (e.g., the DHCP information 1858 stored at the memory 1856). To illustrate, the indication 1209 may have a first value if the first access point and the second access point are managed by a common DHCP server (e.g., the DHCP server 1210*a*). In this case, the mobile device may use the DHCP information 1858 for communications with the second server and may avoid a DHCP reconfiguration process. A second value of the indication 1209 may indicate that the second access point is managed by a different DHCP server than the first access point (e.g., by the DHCP server 1210*b*) and that the mobile device 1800 is to obtain second DHCP information (e.g., a second IP address). In this case, the mobile device 1800 may send a request to the DHCP server 1210*b* requesting the second DHCP information.

The indication 1209 of FIG. 18 enables fast link setup with the second access point. For example, the indication 1209 may enable the mobile device 1800 to avoid automatic DHCP reconfiguration in response to initiating communication with the second access point. Instead, the mobile device 1800 may utilize the DHCP information 1858 based on the indication 1209.

Although certain structures and operations of FIG. 18 have been described with reference to a mobile device (the mobile device 1800), it should be appreciated that one or more structures and operations may be implemented within or performed at another device. For example, one or more structures or operations of FIG. 18 may be implemented within or performed at an AP and/or at a server. An AP and/or a server may include one or more processors corresponding to the processor 1810, as an illustrative example.

Depending on the particular implementation, a device described herein (e.g., a mobile device, an access point, and/or a server) may include one or more circuits to perform certain operations described herein. To illustrate, a device may include an IP reuse circuit, an IP communication circuit, an authentication circuit, a transmitting circuit, a current IP network determination circuit, an IP network equivalence circuit, a previous IP network determination circuit, or a combination thereof. Alternatively or in addition, a device may include a processing unit (e.g., a DSP, CPU, and/or other processing unit) configured to execute instructions to cause the device to perform certain operations described herein.

In connection with the described embodiments, an apparatus includes a memory (e.g., the memory 1856) and an RF interface (e.g., the RF interface 1846). The memory is configured to store DHCP information (e.g., the DHCP information 1858). The RF interface is configured to initiate a link setup procedure with a first access point (e.g., the AP 1204a). The link setup procedure includes receiving the DHCP information via the first access point. The RF interface is further configured to communicate with the first access point using the DHCP information. The RF interface is further configured to initiate communication with a second access point (e.g., the AP 1204b) and to receive an indication (e.g., the indication 1209) from the second access point identifying whether to communicate with the second access point using the DHCP information. A value of the indication identifies whether link setup time with the second access point may be reduced by avoiding DHCP reconfiguration with the second access point.

In connection with the described embodiments, a computer-readable medium (e.g., the memory 1856) stores instructions executable by a processor (e.g., the processor 1810) of a mobile device (e.g., the mobile device 1800) to cause the mobile device to perform operations that reduce link setup time. The operations include initiating a link setup procedure with a first access point (e.g., the AP 1204a). The link setup procedure includes receiving DHCP information (e.g., the DHCP information 1858) via the first access point. The operations further include communicating with the first access point using the DHCP information and initiating communication with a second access point (e.g., the AP 1204b) after communicating with the first access point. The operations further include receiving an indication (e.g., the indication 1209) from the second access point identifying whether the mobile device is able to communicate with the second access point using the DHCP information. A value of the indication identifies whether the mobile device is able to reduce link setup time with the second access point by avoiding DHCP reconfiguration with the second access point.

In connection with the described embodiments, an apparatus includes means for storing (e.g., the memory 1856) DHCP information (e.g., the DHCP information 1858). The apparatus further includes means for initiating (e.g., the RF interface 1846) a link setup procedure with a first access point. The link setup procedure includes receiving DHCP information (e.g., the DHCP information 1858) via the first access point. The apparatus further includes means for communicating (e.g., the RF interface 1846) with the first access point using the DHCP information, means for initiating communication with a second access point, and means for receiving an indication from the second access point identifying whether to communicate with the second access point using the DHCP information. The indication may correspond to the indication 1209. The first access point may correspond to the AP 1204a, and the second access point may correspond to the AP 1204b. A value of the indication identifies whether link setup time with the second access point may be reduced by avoiding DHCP reconfiguration with the second access point.

Although the examples FIGS. 1-11 and FIGS. 12-18 are described separately for convenience of illustration, it should be appreciated that one or more structures and operations described with reference to FIGS. 1-11 may be implemented at one or more devices described with reference to FIGS. 12-18. For example, certain features of the system 100 of FIG. 1 may correspond to one or more features of the wireless communication system 1200 of FIG. 12. To further illustrate, certain aspects of the mobile device 102 may correspond to features of one or more of the STAs 1206a-1206d. One or more features of the APs 104, 106 may correspond to one or more features of the APs 1204a-b. The AAA server 108 may correspond to the server 1212, the authentication server 1308, the local ER server 1408, or a combination thereof. The DHCP server 110 may correspond to any of the DHCP servers 1210a-b and 1309. One or more components of the device 1100 of FIG. 11 may correspond to one or more components of the device 1800 of FIG. 18. Moreover, certain embodiments in accordance with the present disclosure may include aspects of multiple fast initial link setup methods described herein. To illustrate, a particular mobile device may be capable of requesting reassignment of the same IP address during handoff, as described with reference to FIGS. 1-11, as well as automatically reusing previous DHCP information based on an indication that two APs are part of a common network, as described with reference to FIGS. 12-18.

It should be noted that although various embodiments have been described herein as being associated with particular messaging protocols, the examples of such protocols are for illustration only and are not to be considered limiting. In alternate embodiments, different messaging protocols may be used and/or combined without departing from the scope of the present disclosure. For example, an IP address may be communicated between devices (e.g., two or more devices selected from the mobile device 102, the first AP 104, the second AP 106, the AAA server 108, and the DHCP server 110) as part of (e.g., an attribute within) an AAA message, an EAP message, and/or a remote authentication dial in user service (RADIUS) message. Further, in selected embodiments, a first message corresponding to a first protocol may be encapsulated in a second message corresponding to a second protocol. To illustrate, an IP address may be included in an EAP message that is encapsulated in a RADIUS message.

One or more of the disclosed embodiments may be implemented in a system or an apparatus that includes a mobile phone, a smart phone, a cellular phone, a computer, a tablet computer, a portable digital video player, a portable computer, a portable music player, a personal digital assistant (PDA), a mobile location data unit. Additionally, the system or the apparatus may include a mobile phone, a smart phone, a cellular phone, a computer, a tablet computer, a communications device, a fixed location data unit, a set top box, an entertainment unit, a navigation device, a monitor, a computer monitor, a television, a tuner, a radio, a satellite radio, a music player, a digital music player, a video player, a digital video player, a digital video disc (DVD) player, a desktop computer, any other device that stores or retrieves data or computer instructions, or a combination thereof. As another illustrative, non-limiting example, the system or the apparatus may include remote units, such as global positioning system (GPS) enabled devices, navigation devices, fixed location data units such as meter reading equipment, or any other electronic device. Although one or more of FIGS. 1-18 illustrate systems, apparatuses, and/or methods according to the teachings of the disclosure, the disclosure is not limited to these illustrated systems, apparatuses, and/or methods. Embodiments of the disclosure may be suitably employed in any device that includes circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above (e.g., any operation illustrated in the FIGS. 1-18) may be performed by any suitable means capable of performing the operations, such as various hardware and/or software component(s), circuits, and/or module(s). Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array (FPGA), a programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of computer program data from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store program code in the form of instructions or data and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk where disks usually reproduce data magnetically, while discs reproduce data optically with lasers. Thus, in some aspects computer-readable medium may include a non-transitory computer-readable medium (e.g., tangible media). Combinations of the above should also be included within the scope of computer-readable media.

The methods disclosed herein include one or more steps or actions. The method steps and/or actions may be interchanged with one another without departing from the scope of the claims. In other words, unless a specific order of steps or actions is specified, the order and/or use of specific steps and/or actions may be modified without departing from the scope of the disclosure.

Certain aspects may include a computer program product for performing the operations presented herein. For example, a computer program product may include a computer-readable storage medium having instructions stored (and/or encoded) thereon, the instructions being executable by one or more processors to perform the operations described herein. The computer program product may include packaging material.

Further, it should be appreciated that modules and/or other appropriate means for performing the methods and techniques described herein can be downloaded and/or otherwise obtained by a user terminal and/or base station as applicable.

Alternatively, various methods described herein can be provided via storage means (e.g., RAM, ROM, or a physical storage medium such as a compact disc (CD)). Moreover, any other suitable technique for providing the methods and techniques described herein can be utilized. It is to be understood that the scope of the disclosure is not limited to the precise configuration and components illustrated above.

The previous description of the disclosed embodiments is provided to enable a person skilled in the art to make or use the disclosed embodiments. While the foregoing is directed to aspects of the present disclosure, other aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method of operation of a mobile device to reduce link setup time, the method comprising:
   initiating a link setup procedure with a first access point, wherein the link setup procedure includes receiving dynamic host configuration protocol (DHCP) information via the first access point;
   communicating with the first access point using the DHCP information;
   after communicating with the first access point, initiating communication with a second access point; and
   prior to initiating DHCP reconfiguration with the second access point, receiving an indication from the second access point identifying whether the mobile device is able to communicate with the second access point using the DHCP information,
   wherein a value of the indication identifies whether the mobile device is able to reduce link setup time with the second access point by avoiding the DHCP reconfiguration with the second access point.

2. The method of claim 1, wherein the DHCP information includes an Internet Protocol (IP) address, and wherein the indication includes a same network flag.

3. The method of claim 2, wherein communicating with the first access point using the DHCP information includes receiving data via the first access point, the data addressed to the mobile device via the IP address.

4. The method of claim 1, wherein initiating communication with the second access point includes performing an initial link setup to establish connectivity with the second access point.

5. The method of claim 1, wherein the indication identifies whether the first access point and the second access point are included in a common network.

6. The method of claim 5, wherein the common network includes a common DHCP server, and wherein the first access point and the second access point each communicate with the common DHCP server.

7. The method of claim 1, further comprising communicating with the second access point using the DHCP information, wherein the first access point and the second access point are in communication with a common DHCP server.

8. The method of claim 1, wherein the first access point is in communication with a first DHCP server, and further comprising:
   requesting DHCP information from a second DHCP server in communication with the second access point; and
   communicating with the second access point using the DHCP information from the second DHCP server.

9. The method of claim 1, wherein the indication is distinct from the DHCP information.

10. The method of claim 1, further comprising associating with the second access point without initiating communication between the second access point and a DHCP server.

11. The method of claim 1, wherein the indication includes an authentication message that includes a same network flag.

12. An apparatus comprising:
   a memory configured to store dynamic host configuration protocol (DHCP) information; and
   a radio frequency (RF) interface configured to initiate a link setup procedure with a first access point, wherein the link setup procedure includes receiving the DHCP information via the first access point, wherein the RF interface is further configured to communicate with the first access point using the DHCP information, to initiate communication with a second access point, and, prior to initiating DHCP reconfiguration with the second access point, to receive an indication from the second access point identifying whether to communicate with the second access point using the DHCP information,
   wherein a value of the indication identifies whether link setup time with the second access point may be reduced by avoiding the DHCP reconfiguration with the second access point.

13. The apparatus of claim 12, wherein the DHCP information includes an Internet Protocol (IP) address.

14. The apparatus of claim 12, wherein the indication identifies whether the first access point and the second access point are included in a common network.

15. The apparatus of claim 14, wherein the common network includes a common DHCP server, and wherein the first access point and the second access point each communicate with the common DHCP server.

16. The apparatus of claim 12, wherein the DHCP information is received from a first DHCP server, and further comprising a processor coupled to the memory, wherein the processor is configured to access the DHCP information to determine whether to communicate with the second access point using the DHCP information or to request DHCP information from a second DHCP server.

17. The apparatus of claim 16, wherein the memory is further configured to store the DHCP information from the second DHCP server after receiving the DHCP information from the second DHCP server.

18. The apparatus of claim 12, integrated within a mobile device.

19. A computer-readable medium storing instructions executable by a processor of a mobile device to cause the mobile device to perform operations that reduce link setup time, the operations comprising:
   initiating a link setup procedure with a first access point, wherein the link setup procedure includes receiving dynamic host configuration protocol (DHCP) information via the first access point;
   communicating with the first access point using the DHCP information;
   after communicating with the first access point, initiating communication with a second access point; and
   prior to initiating DHCP reconfiguration with the second access point, receiving an indication from the second access point identifying whether the mobile device is able to communicate with the second access point using the DHCP information, wherein a value of the indication identifies whether the mobile device is able to reduce link setup time with the second access point by avoiding the DHCP reconfiguration with the second access point.

20. The computer-readable medium of claim 19, wherein the indication identifies whether the first access point and the second access point are included in a common network.

21. The computer-readable medium of claim 20, wherein the common network includes a common DHCP server, and wherein the first access point and the second access point each communicate with the common DHCP server.

22. The computer-readable medium of claim 19, wherein the operations further include communicating with the second access point using the DHCP information, wherein the first access point and the second access point are in communication with a common DHCP server.

23. The computer-readable medium of claim 22, wherein the first access point is in communication with a first DHCP server, and wherein the operations further include:
requesting DHCP information from a second DHCP server in communication with the second access point; and
communicating with the second access point using the DHCP information from the second DHCP server.

24. The computer-readable medium of claim 19, wherein the DHCP information includes an Internet Protocol (IP) address.

25. The computer-readable medium of claim 24, wherein communicating with the first access point using the DHCP information includes receiving data via the first access point, the data addressed to the mobile device via the IP address.

26. The computer-readable medium of claim 19, wherein initiating communication with the second access point includes performing an initial link setup to establish connectivity with the second access point.

27. An apparatus comprising:
means for initiating a link setup procedure with a first access point, wherein the link setup procedure includes receiving dynamic host configuration protocol (DHCP) information via the first access point;
means for communicating with the first access point using the DHCP information;
means for initiating communication with a second access point after communicating with the first access point; and
means for receiving, prior to initiating DHCP reconfiguration with the second access point, an indication from the second access point identifying whether to communicate with the second access point using the DHCP information,
wherein a value of the indication identifies whether link setup time with the second access point may be reduced by avoiding the DHCP reconfiguration with the second access point.

28. The apparatus of claim 27, wherein the DHCP information includes an Internet Protocol (IP) address.

29. The apparatus of claim 27, wherein the indication identifies whether the first access point and the second access point are included in a common network.

30. The apparatus of claim 29, wherein the common network includes a common DHCP server, and wherein the first access point and the second access point each communicate with the common DHCP server.

31. The apparatus of claim 27, further comprising means for storing the DHCP information.

32. The apparatus of claim 31, further comprising means for executing instructions, wherein the means for executing instructions is configured to access the DHCP information from the means for storing.

33. The apparatus of claim 27, wherein the indication includes a same network flag.

34. A method of operation of an access point to reduce link setup time, the method comprising:
receiving a communication from a mobile device; and
prior to initiation of dynamic host configuration protocol (DHCP) reconfiguration by the mobile device, sending, to the mobile device, an indication, wherein a value of the indication identifies whether the DHCP reconfiguration is avoidable.

35. The method of claim 34, wherein the indication includes a same network flag.

36. An apparatus comprising:
a memory; and
a processor coupled to the memory, the processor configured to process a communication received from a mobile device and, prior to initiation of dynamic host configuration protocol (DHCP) reconfiguration by the mobile device, to send an indication to the mobile device, wherein a value of the indication identifies whether the DHCP reconfiguration is avoidable.

37. The apparatus of claim 36, wherein the communication includes an authentication message.

38. An apparatus comprising:
means for receiving a communication from a mobile device; and
means for sending an indication to the mobile device prior to initiation of dynamic host configuration protocol (DHCP) reconfiguration by the mobile device, wherein a value of the indication identifies whether the DHCP reconfiguration is avoidable.

39. The apparatus of claim 38, wherein the indication includes an authentication message that includes a same network flag.

40. A computer-readable medium storing instructions executable by a processor of an access point to cause the access point to perform operations that reduce link setup time, the operations comprising:
receiving a communication from a mobile device; and
prior to initiation of dynamic host configuration protocol (DHCP) reconfiguration by the mobile device, sending, to the mobile device, an indication, wherein a value of the indication identifies whether the DHCP reconfiguration is avoidable.

41. The computer-readable medium of claim 40, the operations further comprising receiving an association request from the mobile device, after sending the indication.

* * * * *